US009988526B2

United States Patent
Rodrigues et al.

(10) Patent No.: US 9,988,526 B2
(45) Date of Patent: *Jun. 5, 2018

(54) HYBRID DENDRITE COPOLYMERS, COMPOSITIONS THEREOF AND METHODS FOR PRODUCING THE SAME

(71) Applicant: Akzo Nobel Chemicals International B.V., Amersfoort (NL)

(72) Inventors: Klin Aloysius Rodrigues, Signal Mountain, TN (US); Michael L. Standish, Chattanooga, TN (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/354,994

(22) PCT Filed: Nov. 2, 2012

(86) PCT No.: PCT/EP2012/071741
§ 371 (c)(1),
(2) Date: Apr. 29, 2014

(87) PCT Pub. No.: WO2013/064647
PCT Pub. Date: May 10, 2013

(65) Prior Publication Data
US 2014/0256880 A1    Sep. 11, 2014

Related U.S. Application Data

(60) Provisional application No. 61/555,699, filed on Nov. 4, 2011, provisional application No. 61/555,714, filed on Nov. 4, 2011.

(30) Foreign Application Priority Data

Feb. 9, 2012    (EP) .................................... 12154675

(51) Int. Cl.
| | | |
|---|---|---|
| *C08F 251/00* | (2006.01) | |
| *C08L 33/26* | (2006.01) | |
| *C08F 220/06* | (2006.01) | |
| *C08F 220/58* | (2006.01) | |

(52) U.S. Cl.
CPC ............ *C08L 33/26* (2013.01); *C08F 251/00* (2013.01); *C08F 220/06* (2013.01); *C08F 2220/585* (2013.01); *Y02W 10/37* (2015.05)

(58) Field of Classification Search
CPC ..... C08F 251/00; C08F 285/00; C08F 251/02
See application file for complete search history.

(56) References Cited

U.S. PATENT DOCUMENTS

| | | |
|---|---|---|
| 2,536,658 A | 1/1951 | Rheineck |
| 2,798,053 A | 7/1957 | Brown |
| 2,954,347 A | 9/1960 | St. John et al. |
| 3,048,548 A | 8/1962 | Martin et al. |
| 3,095,391 A * | 6/1963 | Brockway ............... C08B 31/00 526/238.22 |
| 3,308,067 A | 3/1967 | Diehl |
| 3,314,891 A | 4/1967 | Schmolka et al. |
| 3,334,147 A | 8/1967 | Brunelle et al. |
| 3,442,242 A | 5/1969 | Laskey et al. |
| 3,455,839 A | 7/1969 | Rauner |
| 3,518,176 A | 6/1970 | Reyes et al. |
| 3,629,121 A | 12/1971 | Eldib |
| 3,639,312 A | 2/1972 | Turner |
| 3,673,148 A | 6/1972 | Vasta |
| 3,687,878 A | 8/1972 | Imoto et al. |
| 3,723,322 A | 3/1973 | Diehl |
| 3,803,285 A | 4/1974 | Jensen |
| 3,929,107 A | 12/1975 | Renger |
| 3,929,678 A | 12/1975 | Laughlin et al. |
| 3,933,672 A | 1/1976 | Bartolotta et al. |
| 4,048,122 A | 9/1977 | Sibley et al. |
| 4,131,576 A | 12/1978 | Iovine et al. |
| 4,133,779 A | 1/1979 | Hellyer et al. |
| 4,141,841 A | 2/1979 | McDanald |
| 4,228,042 A | 10/1980 | Letton |
| 4,239,660 A | 12/1980 | Kingry |

(Continued)

FOREIGN PATENT DOCUMENTS

| | | |
|---|---|---|
| CA | 2074747 | 2/1993 |
| CN | 1087649 A | 6/1994 |

(Continued)

OTHER PUBLICATIONS

Trimnell, D., et al. "Preparation of starch 2-hydroxy-3-mercaptopropyl ethers and their use in graft polymerizations." Journal of Applied Polymer Science 22.12 (1978): 3579-3586.*
Fu, Zhifeng, Wuping Tao, and Yan Shi. "Synthesis of densely grafted comblike copolymers." Journal of Polymer Science Part A: Polymer Chemistry 46.1 (2008): 362-372.*
Rosen, "Geminis: A new generation of surfactants," Chemtech, pp. 30-33 (Mar. 1993).
"Gemini Surfactants: A New Class of Self-Assembling Molecules," J. American Chemical Soc., vol. 115, pp. 10083-10090 (1993).
Kirk Othmer Encyclopedia of Chemical Technology, 3rd Ed, vol. 7, pp. 430-447 (John Wiley & Sons, Inc., 1979).

(Continued)

*Primary Examiner* — Nicholas E Hill
(74) *Attorney, Agent, or Firm* — Sandra B. Weiss

(57) ABSTRACT

Hybrid dendrite copolymer compositions include a hybrid dendrite copolymer including at least one ethylenically unsaturated first monomer, at least one second ethylenically unsaturated second monomer and a naturally derived hydroxyl containing chain transfer agent as an end group. The at least one first and second ethylenically unsaturated monomers are on separate side chains of the naturally derived hydroxyl containing chain transfer agent. Methods of preparing a hybrid dendrite copolymer are also included.

17 Claims, No Drawings

(56) References Cited

U.S. PATENT DOCUMENTS

| | | |
|---|---|---|
| 4,260,529 A | 4/1981 | Letton |
| 4,265,779 A | 5/1981 | Gandolfo et al. |
| 4,322,472 A | 3/1982 | Kaspar et al. |
| 4,374,035 A | 2/1983 | Bossu |
| 4,379,080 A | 4/1983 | Murphy |
| 4,388,205 A | 6/1983 | Stettler et al. |
| 4,412,934 A | 11/1983 | Chung et al. |
| 4,483,779 A | 11/1984 | Llenado et al. |
| 4,483,780 A | 11/1984 | Llenado |
| 4,536,314 A | 8/1985 | Hardy et al. |
| 4,539,130 A | 9/1985 | Thompson et al. |
| 4,557,763 A | 12/1985 | George et al. |
| 4,565,647 A | 1/1986 | Llenado |
| 4,597,898 A | 7/1986 | Vander Meer |
| 4,605,721 A | 8/1986 | Jenkins et al. |
| 4,606,838 A | 8/1986 | Burns |
| 4,618,914 A | 10/1986 | Sato et al. |
| 4,634,551 A | 1/1987 | Burns et al. |
| 4,652,392 A | 3/1987 | Baginski et al. |
| 4,671,891 A | 6/1987 | Hartman |
| 4,681,592 A | 7/1987 | Hardy et al. |
| 4,681,695 A | 7/1987 | Divo |
| 4,681,704 A | 7/1987 | Bernardino et al. |
| 4,686,063 A | 8/1987 | Burns |
| 4,702,857 A | 10/1987 | Gosselink |
| 4,782,901 A | 11/1988 | Phelps et al. |
| 4,830,773 A | 5/1989 | Olson |
| 4,855,069 A | 8/1989 | Schuppiser et al. |
| 4,963,629 A | 10/1990 | Driemel et al. |
| 4,968,451 A | 11/1990 | Scheibel et al. |
| 5,032,659 A | 7/1991 | Heidel |
| 5,071,895 A | 12/1991 | Hughes et al. |
| 5,076,968 A | 12/1991 | Fringeli et al. |
| 5,121,795 A | 6/1992 | Ewert et al. |
| 5,125,455 A | 6/1992 | Harris et al. |
| 5,223,171 A | 6/1993 | Jost et al. |
| 5,227,446 A | 7/1993 | Denzinger et al. |
| 5,248,449 A | 9/1993 | Mitchell et al. |
| 5,264,470 A | 11/1993 | Eoff |
| 5,296,470 A | 3/1994 | Vaslin et al. |
| 5,304,620 A | 4/1994 | Holtmyer et al. |
| 5,326,864 A | 7/1994 | Besemer et al. |
| 5,332,528 A | 7/1994 | Pan et al. |
| 5,378,830 A | 1/1995 | Yeh |
| 5,385,959 A | 1/1995 | Tsaur et al. |
| 5,412,026 A | 5/1995 | Holy et al. |
| 5,415,807 A | 5/1995 | Gosselink et al. |
| 5,435,935 A | 7/1995 | Kupneski |
| 5,478,503 A | 12/1995 | Swift |
| 5,500,154 A | 3/1996 | Bacon et al. |
| 5,501,815 A | 3/1996 | Man |
| 5,518,646 A | 5/1996 | Van den Brom |
| 5,518,657 A | 5/1996 | Fringeli et al. |
| 5,523,023 A | 6/1996 | Kleinstuck et al. |
| 5,543,459 A | 8/1996 | Hartmann et al. |
| 5,547,612 A | 8/1996 | Austin et al. |
| 5,565,145 A | 10/1996 | Watson et al. |
| 5,580,154 A | 12/1996 | Coulter et al. |
| 5,580,941 A | 12/1996 | Krause et al. |
| 5,583,193 A | 12/1996 | Aravindakshan et al. |
| 5,654,198 A | 8/1997 | Carrier et al. |
| 5,656,646 A | 8/1997 | Perner et al. |
| 5,658,651 A | 8/1997 | Smith et al. |
| 5,670,475 A | 9/1997 | Trinh et al. |
| 5,674,511 A | 10/1997 | Kacher et al. |
| 5,753,770 A | 5/1998 | Breitenbach et al. |
| 5,756,442 A | 5/1998 | Jeschke et al. |
| 5,760,154 A | 6/1998 | Krause et al. |
| 5,830,241 A | 11/1998 | Rohringer et al. |
| 5,852,069 A | 12/1998 | Meister et al. |
| 5,854,191 A | 12/1998 | Krause et al. |
| 5,854,321 A | 12/1998 | Krause et al. |
| 5,869,070 A | 2/1999 | Dixon et al. |
| 5,942,477 A | 8/1999 | Giret et al. |
| 5,942,479 A | 8/1999 | Frankenbach et al. |
| 5,942,485 A | 8/1999 | Kemen |
| 5,945,127 A | 8/1999 | Breitenbach et al. |
| 5,952,278 A | 9/1999 | Mao et al. |
| 5,977,275 A | 11/1999 | Rodrigues et al. |
| 5,985,809 A | 11/1999 | Frankenbach et al. |
| 5,990,065 A | 11/1999 | Vinson et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,025,311 A | 2/2000 | Clarke et al. |
| 6,060,299 A | 5/2000 | Sreekrishna et al. |
| 6,060,443 A | 5/2000 | Cripe et al. |
| 6,060,582 A | 5/2000 | Hubbell et al. |
| 6,069,122 A | 5/2000 | Vinson et al. |
| 6,093,856 A | 7/2000 | Cripe et al. |
| 6,103,839 A | 8/2000 | Patel et al. |
| 6,106,849 A | 8/2000 | Malkan et al. |
| 6,130,194 A | 10/2000 | Pancheri et al. |
| 6,136,769 A | 10/2000 | Asano et al. |
| 6,143,707 A | 11/2000 | Trinh et al. |
| 6,150,322 A | 11/2000 | Singleton et al. |
| 6,153,570 A | 11/2000 | Decoster |
| 6,153,577 A | 11/2000 | Cripe et al. |
| 6,162,423 A | 12/2000 | Sebag et al. |
| 6,169,062 B1 | 1/2001 | Salager et al. |
| 6,194,362 B1 | 2/2001 | Trinh et al. |
| 6,221,825 B1 | 4/2001 | Williams, Jr. et al. |
| 6,225,462 B1 | 5/2001 | Berry et al. |
| 6,231,650 B1 | 5/2001 | Mallow et al. |
| 6,255,427 B1 * | 7/2001 | Exner et al. .......... 527/300 |
| 6,303,560 B1 | 10/2001 | Hartan et al. |
| 6,365,561 B1 | 4/2002 | Vinson et al. |
| 6,372,708 B1 | 4/2002 | Kasturi et al. |
| 6,376,438 B1 | 4/2002 | Rosenberger et al. |
| 6,384,132 B1 | 5/2002 | Horley et al. |
| 6,423,775 B1 | 7/2002 | Brune et al. |
| 6,451,747 B1 | 9/2002 | Decoster |
| 6,482,994 B2 | 11/2002 | Scheper et al. |
| 6,528,477 B2 | 3/2003 | Kasturi et al. |
| 6,537,957 B1 | 3/2003 | Cardola et al. |
| 6,573,234 B1 | 6/2003 | Sivik et al. |
| 6,589,926 B1 | 7/2003 | Vinson et al. |
| 6,605,182 B1 | 8/2003 | Danner |
| 6,627,590 B1 | 9/2003 | Sherry et al. |
| 6,645,925 B2 | 11/2003 | Sivik et al. |
| 6,656,900 B2 | 12/2003 | Sivik et al. |
| 6,764,992 B2 | 7/2004 | Kumar et al. |
| 6,800,712 B2 | 10/2004 | Doane et al. |
| 6,867,262 B1 | 3/2005 | Angel et al. |
| 6,908,955 B2 | 6/2005 | Porsch et al. |
| 6,911,053 B1 | 6/2005 | Bijsterbosch et al. |
| 7,012,048 B2 | 3/2006 | Drovetskaya et al. |
| 7,087,662 B2 | 8/2006 | Ghosh |
| 7,151,079 B2 | 12/2006 | Fack et al. |
| 7,153,821 B2 | 12/2006 | Blokzijl et al. |
| 7,157,413 B2 | 1/2007 | Lazzeri et al. |
| 7,435,293 B2 | 10/2008 | Caveny et al. |
| 7,589,051 B2 | 9/2009 | Erazo-Majewicz et al. |
| 7,666,963 B2 | 2/2010 | Rodrigues et al. |
| 7,670,388 B2 | 3/2010 | Sugano et al. |
| 7,727,945 B2 | 6/2010 | Rodrigues et al. |
| 7,740,873 B2 | 6/2010 | Decoster et al. |
| 7,754,666 B2 | 7/2010 | Walters et al. |
| 7,902,276 B2 | 3/2011 | Sakai et al. |
| 9,051,406 B2 * | 6/2015 | Rodrigues |
| 2002/0016282 A1 | 2/2002 | Kumar et al. |
| 2002/0034487 A1 | 3/2002 | Maubru et al. |
| 2002/0055446 A1 | 5/2002 | Perron et al. |
| 2002/0106747 A1 | 8/2002 | Cheng et al. |
| 2002/0173592 A1 | 11/2002 | Saeki et al. |
| 2003/0008793 A1 | 1/2003 | Takiguchi et al. |
| 2003/0008804 A1 | 1/2003 | Xu et al. |
| 2003/0092584 A1 | 5/2003 | Crews |
| 2003/0147827 A1 | 8/2003 | Decoster et al. |
| 2003/0147842 A1 | 8/2003 | Restle et al. |
| 2003/0211952 A1 | 11/2003 | Erazo Majewicz et al. |
| 2004/0033929 A1 | 2/2004 | Bertleff et al. |
| 2004/0039137 A1 | 2/2004 | Heinemann et al. |

(56) References Cited

U.S. PATENT DOCUMENTS

| | | |
|---|---|---|
| 2004/0048760 A1 | 3/2004 | Rabon et al. |
| 2004/0067864 A1 | 4/2004 | Aubay et al. |
| 2004/0067865 A1 | 4/2004 | Harrison |
| 2004/0071742 A1 | 4/2004 | Popplewell et al. |
| 2004/0092425 A1 | 5/2004 | Boutique et al. |
| 2004/0102354 A1 | 5/2004 | Fack et al. |
| 2004/0103483 A1 | 6/2004 | Delplancke et al. |
| 2004/0107505 A1 | 6/2004 | Harrison et al. |
| 2004/0147425 A1 | 7/2004 | Castro et al. |
| 2004/0170596 A1 | 9/2004 | Hauschel et al. |
| 2004/0214736 A1 | 10/2004 | Modi |
| 2004/0266653 A1 | 12/2004 | Delplancke et al. |
| 2004/0266655 A1 | 12/2004 | Baum et al. |
| 2005/0019352 A1 | 1/2005 | Mercier et al. |
| 2005/0028293 A1 | 2/2005 | Geffroy |
| 2005/0108832 A1 | 5/2005 | Torri et al. |
| 2005/0143278 A1 | 6/2005 | Pegelow et al. |
| 2005/0171287 A1 | 8/2005 | Baum et al. |
| 2005/0175572 A1 | 8/2005 | Nguyen-Kim et al. |
| 2005/0176878 A1 | 8/2005 | Ettl et al. |
| 2005/0202985 A1 | 9/2005 | Nieendick et al. |
| 2005/0202989 A1 | 9/2005 | Wilson |
| 2005/0215449 A1 | 9/2005 | Penninger et al. |
| 2005/0256027 A1 | 11/2005 | Heibel et al. |
| 2005/0267008 A1 | 12/2005 | Carvell et al. |
| 2005/0271595 A1 | 12/2005 | Brown |
| 2005/0276831 A1 | 12/2005 | Dihora et al. |
| 2006/0019847 A1 | 1/2006 | Fan et al. |
| 2006/0019858 A1 | 1/2006 | Kruse et al. |
| 2006/0024353 A1 | 2/2006 | Trouve et al. |
| 2006/0029561 A1 | 2/2006 | Gunn et al. |
| 2006/0106186 A1 | 5/2006 | Dupont et al. |
| 2006/0111511 A1 | 5/2006 | Narayan et al. |
| 2006/0182917 A1 | 8/2006 | Wood et al. |
| 2006/0183203 A1 | 8/2006 | DeAngelis |
| 2006/0183856 A1 | 8/2006 | Wood et al. |
| 2006/0183857 A1 | 8/2006 | Wood et al. |
| 2006/0252901 A1 | 11/2006 | Narayan et al. |
| 2006/0258555 A1 | 11/2006 | Filippini et al. |
| 2006/0258557 A1 | 11/2006 | Popplewell et al. |
| 2006/0281654 A1 | 12/2006 | Brooker et al. |
| 2007/0015678 A1 | 1/2007 | Rodrigues et al. |
| 2007/0021577 A1* | 1/2007 | Rodrigues et al. ........... 527/309 |
| 2007/0054816 A1 | 3/2007 | Berthier et al. |
| 2007/0056900 A1 | 3/2007 | Mathauer et al. |
| 2007/0111920 A1 | 5/2007 | Baur et al. |
| 2007/0138105 A1 | 6/2007 | Takeda et al. |
| 2007/0260046 A1 | 11/2007 | Tomita et al. |
| 2008/0020948 A1 | 1/2008 | Rodrigues et al. |
| 2008/0020961 A1 | 1/2008 | Rodrigues et al. |
| 2008/0021167 A1 | 1/2008 | Rodrigues |
| 2008/0021168 A1 | 1/2008 | Rodrigues et al. |
| 2008/0118568 A1 | 5/2008 | Smets et al. |
| 2008/0139441 A1 | 6/2008 | Xiao et al. |
| 2008/0146478 A1 | 6/2008 | Lei et al. |
| 2008/0230193 A1 | 9/2008 | Mori et al. |
| 2008/0274940 A1 | 11/2008 | Tjelta et al. |
| 2008/0274942 A1 | 11/2008 | Tjelta et al. |
| 2008/0277620 A1 | 11/2008 | Kesavan et al. |
| 2008/0305982 A1 | 12/2008 | Smets et al. |
| 2008/0311064 A1 | 12/2008 | Lei et al. |
| 2009/0011214 A1 | 1/2009 | Wang |
| 2009/0011973 A1 | 1/2009 | Besse et al. |
| 2009/0023625 A1 | 1/2009 | Tang et al. |
| 2009/0062175 A1 | 3/2009 | Cermenati et al. |
| 2009/0087390 A1 | 4/2009 | Modi |
| 2009/0176687 A1 | 7/2009 | Tjelta et al. |
| 2009/0258042 A1 | 10/2009 | Anastasiou et al. |
| 2009/0258810 A1 | 10/2009 | Song et al. |
| 2009/0326165 A1 | 12/2009 | Patil et al. |
| 2010/0008870 A1 | 1/2010 | Dihora et al. |
| 2010/0056413 A1 | 3/2010 | Harry, Jr. et al. |
| 2010/0069280 A1 | 3/2010 | Rodrigues et al. |
| 2010/0075879 A1 | 3/2010 | Gizaw et al. |
| 2010/0075880 A1 | 3/2010 | Dupont et al. |
| 2010/0075887 A1 | 3/2010 | Wang et al. |
| 2010/0086575 A1 | 4/2010 | Dihora et al. |
| 2010/0093584 A1 | 4/2010 | Brand et al. |
| 2010/0154831 A1 | 6/2010 | Neplenbrock et al. |
| 2010/0167547 A1 | 7/2010 | Kamimura |
| 2010/0236736 A1 | 9/2010 | Brockmeyer et al. |
| 2010/0280146 A1 | 11/2010 | Vanderlaan et al. |
| 2010/0317560 A1 | 12/2010 | Ryther et al. |
| 2011/0017945 A1 | 1/2011 | Miralles et al. |
| 2011/0021410 A1 | 1/2011 | Mlralles et al. |
| 2011/0021734 A1* | 1/2011 | Samaranayake et al. ..... 527/314 |
| 2011/0028371 A1* | 2/2011 | Rodrigues et al. ........... 510/220 |
| 2011/0034622 A1 | 2/2011 | Kawamura et al. |
| 2011/0118168 A1* | 5/2011 | Schunicht et al. ............ 510/400 |
| 2011/0136718 A1 | 6/2011 | Rodrigues et al. |
| 2013/0035273 A1 | 2/2013 | Silvernail et al. |
| 2013/0035274 A1 | 2/2013 | Silvernail et al. |
| 2013/0035275 A1 | 2/2013 | Silvernail et al. |
| 2013/0035276 A1 | 2/2013 | Silvernail et al. |
| 2013/0035277 A1 | 2/2013 | Silvernail et al. |
| 2014/0309392 A1* | 10/2014 | Rodrigues ................ 526/238.22 |

FOREIGN PATENT DOCUMENTS

| | | |
|---|---|---|
| CN | 101830015 A | 9/2010 |
| CN | 101863540 A | 10/2010 |
| CN | 102146150 A | 8/2011 |
| DE | 40 38 908 A1 | 6/1992 |
| EP | 0 130 756 A1 | 1/1985 |
| EP | 0 404 377 A1 | 12/1990 |
| EP | 0 405 917 A1 | 1/1991 |
| EP | 00438215 | 1/1991 |
| EP | 0 441 197 A2 | 8/1991 |
| EP | 0 479 245 A2 | 4/1992 |
| EP | 0 526 800 A1 | 2/1993 |
| EP | 0 577 519 A1 | 1/1994 |
| EP | 0 605 084 A1 | 7/1994 |
| EP | 0505371 B1 | 3/1996 |
| EP | 0 725 131 A1 | 8/1996 |
| EP | 0725131 A1 | 8/1996 |
| EP | 0526800 B1 | 1/1997 |
| EP | 0 869 169 A1 | 10/1998 |
| EP | 0653485 B1 | 5/2000 |
| EP | 1 007 529 B1 | 6/2000 |
| EP | 1 022 294 B1 | 7/2000 |
| EP | 1021156 B1 | 7/2000 |
| EP | 1043388 B1 | 10/2000 |
| EP | 1043389 B1 | 10/2000 |
| EP | 0703243 B1 | 12/2000 |
| EP | 0628655 B1 | 5/2001 |
| EP | 1 236 748 A1 | 9/2002 |
| EP | 1506765 B1 | 2/2005 |
| EP | 1162257 B1 | 2/2006 |
| EP | 1520004 B1 | 12/2006 |
| EP | 1 881 017 A2 | 1/2008 |
| EP | 1997874 A1 | 3/2008 |
| EP | 1950232 A1 | 7/2008 |
| EP | 1699429 B1 | 10/2008 |
| EP | 2014757 A1 | 1/2009 |
| EP | 1741775 B1 | 4/2009 |
| EP | 2 072 531 A1 | 6/2009 |
| EP | 2 138 560 B1 | 12/2009 |
| EP | 1877171 B1 | 3/2010 |
| FR | 2856073 A1 | 12/2004 |
| FR | 2 908 135 A1 | 5/2008 |
| FR | 2 927 083 A1 | 8/2009 |
| GB | 1137741 | 12/1968 |
| GB | 1322536 A | 7/1973 |
| GB | 1355998 A | 6/1974 |
| GB | 1464616 A | 2/1977 |
| GB | 2322137 A | 8/1998 |
| GB | 2432844 A | 6/2007 |
| GB | 2432852 A | 6/2007 |
| JP | 57-082145 | 5/1982 |
| JP | 61-31497 | 2/1986 |
| JP | H05-132528 A | 5/1993 |
| JP | 6157253 | 6/1994 |
| JP | 6-298866 | 10/1994 |
| JP | 6-315622 | 11/1994 |

(56) References Cited

FOREIGN PATENT DOCUMENTS

| | | |
|---|---|---|
| JP | 9249892 | 9/1997 |
| JP | 11-343449 | 12/1999 |
| JP | 2000017299 | 1/2000 |
| JP | 2002-526611 | 8/2002 |
| JP | 2002285019 | 10/2002 |
| JP | 2004-107233 | 4/2004 |
| JP | 2005-120045 | 5/2005 |
| JP | 2005-532304 | 10/2005 |
| JP | 2008208051 | 9/2008 |
| JP | 2010-47713 | 3/2010 |
| JP | 2011-195809 | 10/2011 |
| WO | WO 91/06637 | 5/1991 |
| WO | WO 92/06162 | 4/1992 |
| WO | WO 92/10433 | 6/1992 |
| WO | WO 93/02118 | 2/1993 |
| WO | WO 93/11214 | 6/1993 |
| WO | WO 93/19038 | 9/1993 |
| WO | WO 93/19146 | 9/1993 |
| WO | WO 94/09099 | 4/1994 |
| WO | WO 95/10591 | 4/1995 |
| WO | WO 95/26393 | 10/1995 |
| WO | WO 1995/026710 A1 | 10/1995 |
| WO | WO 1996/035645 A1 | 11/1996 |
| WO | WO 1996/037530 A1 | 11/1996 |
| WO | WO 1997/045510 A1 | 12/1997 |
| WO | WO 1998/018352 A1 | 5/1998 |
| WO | WO 98/35002 | 8/1998 |
| WO | WO 98/35003 | 8/1998 |
| WO | WO 98/35004 | 8/1998 |
| WO | WO 98/35005 | 8/1998 |
| WO | WO 98/35006 | 8/1998 |
| WO | WO 1998/049260 A1 | 11/1998 |
| WO | WO 99/02663 | 1/1999 |
| WO | WO 99/05082 | 2/1999 |
| WO | WO 99/05084 | 2/1999 |
| WO | WO 99/05241 | 2/1999 |
| WO | WO 99/05242 | 2/1999 |
| WO | WO 99/05243 | 2/1999 |
| WO | WO 99/05244 | 2/1999 |
| WO | WO 99/07656 | 2/1999 |
| WO | WO 99/20726 | 4/1999 |
| WO | WO 99/27083 | 6/1999 |
| WO | WO 1999/036470 A1 | 7/1999 |
| WO | WO 2000/012661 A1 | 3/2000 |
| WO | WO 2000/015180 A1 | 3/2000 |
| WO | WO 00/20470 | 4/2000 |
| WO | WO 00/23548 | 4/2000 |
| WO | WO 00/23549 | 4/2000 |
| WO | WO 2000/018868 A1 | 4/2000 |
| WO | WO 2000/036076 A1 | 6/2000 |
| WO | WO 00/47708 | 8/2000 |
| WO | WO 2001/024779 A1 | 4/2001 |
| WO | WO 01/32816 A1 | 5/2001 |
| WO | WO 01/42408 A2 | 6/2001 |
| WO | WO 2002/038715 A2 | 5/2002 |
| WO | WO 2002/044686 A2 | 6/2002 |
| WO | WO 03/042262 A2 | 5/2003 |
| WO | WO 2003/095597 A1 | 11/2003 |
| WO | WO 2004/046301 A1 | 6/2004 |
| WO | WO 2004/048418 A2 | 6/2004 |
| WO | WO 2005/012378 A1 | 2/2005 |
| WO | WO 2005/051343 A1 | 6/2005 |
| WO | WO 2005/059023 A1 | 6/2005 |
| WO | WO 2006/002565 A1 | 1/2006 |
| WO | WO 2006/007945 A1 | 1/2006 |
| WO | WO 2006/026406 A2 | 3/2006 |
| WO | WO 2006/119162 A1 | 11/2006 |
| WO | WO 2007/140267 A1 | 12/2007 |
| WO | WO 2008/089262 A1 | 7/2008 |
| WO | WO 2008/144744 A2 | 11/2008 |
| WO | WO 2008/147940 A2 | 12/2008 |
| WO | WO 2009/006603 A1 | 1/2009 |
| WO | WO 2009/087525 A1 | 7/2009 |
| WO | WO 2009/156233 A1 | 12/2009 |
| WO | WO 2009156067 A1 * | 12/2009 |
| WO | WO 2010/057977 A1 | 5/2010 |
| WO | WO 2010/065482 A1 | 6/2010 |
| WO | WO 2010/065483 A1 | 6/2010 |
| WO | WO 2010/079466 A2 | 7/2010 |
| WO | WO 2010/079467 A2 | 7/2010 |
| WO | WO 2010/144575 A1 | 12/2010 |
| WO | WO 2011/008272 A1 | 1/2011 |
| WO | WO 2011/014783 A1 | 2/2011 |
| WO | WO 2011/017223 A1 | 2/2011 |
| WO | WO 2011/025624 A1 | 3/2011 |
| WO | WO 2011/044490 A1 | 4/2011 |
| WO | WO 2011/135313 A1 | 11/2011 |
| WO | WO 2012/000609 A1 | 1/2012 |

OTHER PUBLICATIONS

Kroschwitz, J.I.; Concise Encyclopedia of Polymer Science & Engineering, Ed., Wiley-Interscience, New York, p. 436 (1990).
Mark, Herman F., Concise Encyclopedia of Polymer Science and Technology, 3rd Ed., vol. 11, Wiley-Interscience, New York, p. 380 (2004).
Odian, George; Principles of Polymerization, 2nd Ed., Wiley-Interscience, New York, p. 424 (1970).
Odian, Principles of Polymerization, 2nd Ed., John Wiley & Sons, p. 226, New York (1981).
Wurzburg, Modified Starches: Properties and Uses, Grafted Starches, Chpt. 10, pp. 149-172, CRC Press, Boca Raton (1986).
Dubois et al, "Colorimetric Method for Determination of Sugars and Related Substances," Analytical Chemistry, vol. 28, No. 3, pp. 350-356 (Mar. 1956).
Kwei-Ping, et al, "Chain Transfer constant of Vinylpyrrolidone with Dextran," Institute of Polymer Research, vol. 66, pp. 828-829, May 1962.
European Search Report for EP Application No. 06015025.7; Nov. 13, 2006.
European Search Report for EP Application No. 07014413.4; Nov. 6, 2007.
European Search Report for EP Application No. 07014412.6; Oct. 18, 2007.
European Search Report for EP Application No. 07014412.6; Jan. 23, 2008.
European Search Report for EP Application No. 09175465.5; Jan. 14, 2010.
Chinese Office Action Action dated Jul. 1, 2010 for Patent Application No. 200710169190.X.
International Search Report for PCT Application No. US2010/043919; Completed Sep. 22, 2010.
International Search Report for PCT Application No. US2010/043930; Completed Sep. 23, 2010.
International Search Report and Written Opinion for Application No. PCTEP2011/073928; Completion Date Jan. 18, 2012.
European Search Report for Application No. 11158599.8; Completion Date Aug. 11, 2011.
Shen, et al, "Graft Copolymers of Vinyl Pyrrolidone on Dextran," Journal of Polymer Science, vol. 53, pp. 81-85 (1961).
Kahya, et al, "A Novel Copolymer: Starch-g-Polyvinylpyrrolidone," Starch/Starke 61 (2009), pp. 267-274.
European Search Report for Application No. 12154675.8; Completion Date May 14, 2012.
European Search Report for Application No. 12154684.0; Completion Date May 14, 2012.
English Translation of Japanese Office Action dated Jun. 5, 2012 (Application No. 2006-198098).
International Search Report issued in PCT/US2012/049514 dated Feb. 19, 2013, 3 pages.
International Search Report and Written Opinion issued in PCT/US2012/049595, dated Feb. 25, 2013, 10 pages.
International Search Report and Written Opinion issued in International Application No. PCT/US2012/049547, dated Jan. 23, 2013, 11 pages.
International Search Report and Written Opinion issued in PCT/US2012/049564, dated Jan. 23, 2013, 10 pages.
International Search Report and Written Opinion issued in PCT/US2012/049584, dated Jan. 21, 2013, 11 pages.

(56) References Cited

OTHER PUBLICATIONS

Athawale et al., "Graft Polymerization: Starch as a Model Substrate", J.M.S. Rev. Macromol. Chem. Phys., C39(3), 445-480, 1999.
English Translation of Japanese Office Action dated Oct. 22, 2013 for Application No. 2012-523097.
Willett et al., "Initiator Effects in Reactive Extrusion of Starch-Polyacrylamide Graft Copolymers," Journal of Applied Polymer Science, vol. 99, 52-58 (2006).
Water Purification Handbook, Ch 25, Deposit and Scale Control-Cooling System, retrieved from: http://www.gewater.com/handbook/cooling_water_system.ch_25_deposit.jsp © 1997-2012.

* cited by examiner

HYBRID DENDRITE COPOLYMERS, COMPOSITIONS THEREOF AND METHODS FOR PRODUCING THE SAME

This application is a National Phase Application of PCT Application No. PCT/EP2012/071741, filed Nov. 2, 2012, and claims the benefit of priority to U.S. Provisional Patent Application No. 61/555,699 and 61/555,714 each filed Nov. 4, 2011 and EP Application No. 12154675.8, filed Feb. 9, 2012. Each of these applications is hereby incorporated by reference in its entirety herein.

FIELD OF THE INVENTION

The present invention is relates to hybrid copolymers and hybrid copolymer compositions which contain a portion of a naturally occurring oligomer or polymer and a moiety from a synthetically derived oligomer or polymer.

BACKGROUND

A number of attempts have been made in the past to use natural materials as polymeric building blocks. These have included producing "hybrid" copolymers comprising natural materials (e.g., sugars and starches) polymerized with synthetic monomers using chain transfer techniques, such as disclosed in U.S. Pat. No. 7,666,963, and PCT Publication No. WO 2011/014783.

The synthetic portions of these hybrid copolymers are made up of mixtures of the synthetic monomers if more than one monomer is used. This leads to the formation of synthetic chains in the hybrid copolymer that have a blend of properties of the two monomers, which has been found to not take full advantage of the functionality of both monomer moieties. Accordingly, there is a need to product copolymers or copolymer compositions that can maximize the performance obtained from these monomer moieties.

SUMMARY OF THE INVENTION

In view of the problems noted above, generally, hybrid dendrite copolymers can be synthesized where each synthetic chain contains only one of the monomers. This can be achieved by adding the different monomers sequentially so that the different monomers do not react with each other while forming the synthetic portion of these hybrid dendrite copolymers. Hybrid dendrite copolymer compositions and the hybrid dendrite copolymers derived therefrom contain a portion of a naturally occurring oligomer or polymer and a moiety from a synthetically derived oligomer or polymer. In an aspect, the invention therefore provides a hybrid dendrite copolymer comprising at least one first ethylenically unsaturated monomer, at least one second ethylenically unsaturated monomer, different from said first ethylenically unsaturated monomer, and at least one naturally derived hydroxyl containing chain transfer agent as an end group. The at least one first and the at least one second ethylenically unsaturated monomers are present on separate side chains of the naturally derived hydroxyl containing chain transfer agent.

In another aspect, the invention is directed to a hybrid dendrite copolymer obtained by free radical polymerization of at least one first one ethylenically unsaturated monomer and at least one second ethylenically unsaturated monomer, different from said first ethylenically unsaturated monomer, in the presence of a naturally derived hydroxyl containing chain transfer agent wherein the first and the second ethylenically unsaturated monomers are polymerized sequentially.

DETAILED DESCRIPTION OF THE INVENTION

Generally, the hybrid dendrite copolymers of the instant invention are formed by preparing hybrid dendrite copolymer compositions in which chain transfer of two or more growing synthetic polymer chains of two or more distinct synthetic monomers to a naturally derived hydroxyl containing chain transfer agent occurs in a sequential polymerization. The resulting hybrid dendrite copolymers have at least one first synthetic side chain formed from at least one first monomer $SM_1$, such as acrylic acid, and at least one second synthetic side chain formed from at least one second monomer $SM_2$, different from $SM_1$, such as sulfonated styrene, wherein the two synthetic chains are attached to the naturally derived hydroxyl containing chain transfer agent at separate and different and distinct points. In the hybrid dendrite structure below, K is the moiety derived from the first ethylenically unsaturated synthetic monomer $SM_1$ and L is the moiety derived from the second ethylenically unsaturated synthetic monomer $SM_2$. It is preferable that the separate and distinct points be on the same molecule of the naturally derived hydroxyl containing chain transfer agent as shown in the following illustration:

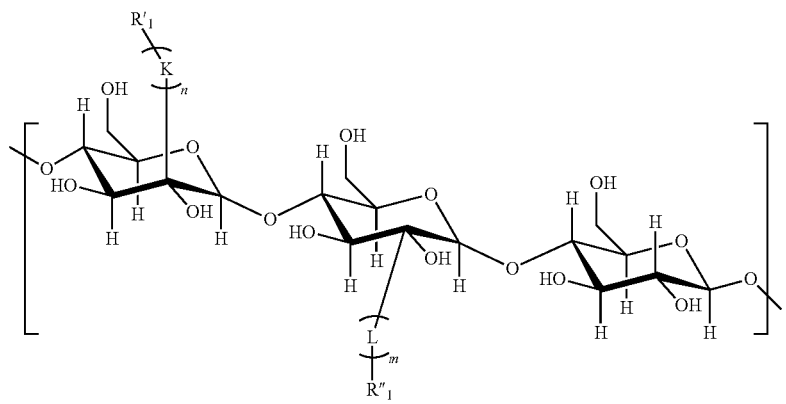

wherein n is the average number of repeat units of the first ethylenically unsaturated monomer, $SM_1$; m is the average number of repeat units of the second ethylenically unsaturated monomer, $SM_2$; K is the moiety derived from the first ethylenically unsaturated synthetic monomer, $SM_1$; L is the moiety derived from the second ethylenically unsaturated synthetic monomer, $SM_2$; $R'_1$ is=the termination product from the polymerization, such as H or an initiator fragment;

and $R''_1$ is=the termination product from the polymerization, such as H or an initiator fragment. $R'_1$ and $R''_1$ can be the same or different.

However, it is possible that the separate and different and distinct points could be on the different molecules of the naturally derived hydroxyl containing chain transfer agent.

Optionally, in any given system a mixture of the above 2 structures may be present.

The resulting materials have the performance properties of synthetic polymers but use lower cost, readily available and environmentally friendly materials derived from renewable sources. These materials can be used in a variety of application areas, including, but not limited to, water treatment, detergent, oil field, dispersant and other aqueous treatment applications.

The reaction for producing traditional hybrid copolymer compositions, such as disclosed in WO 2011/014783, which is incorporated by reference in its entirety herein, is believed to proceed according to the following mechanism:

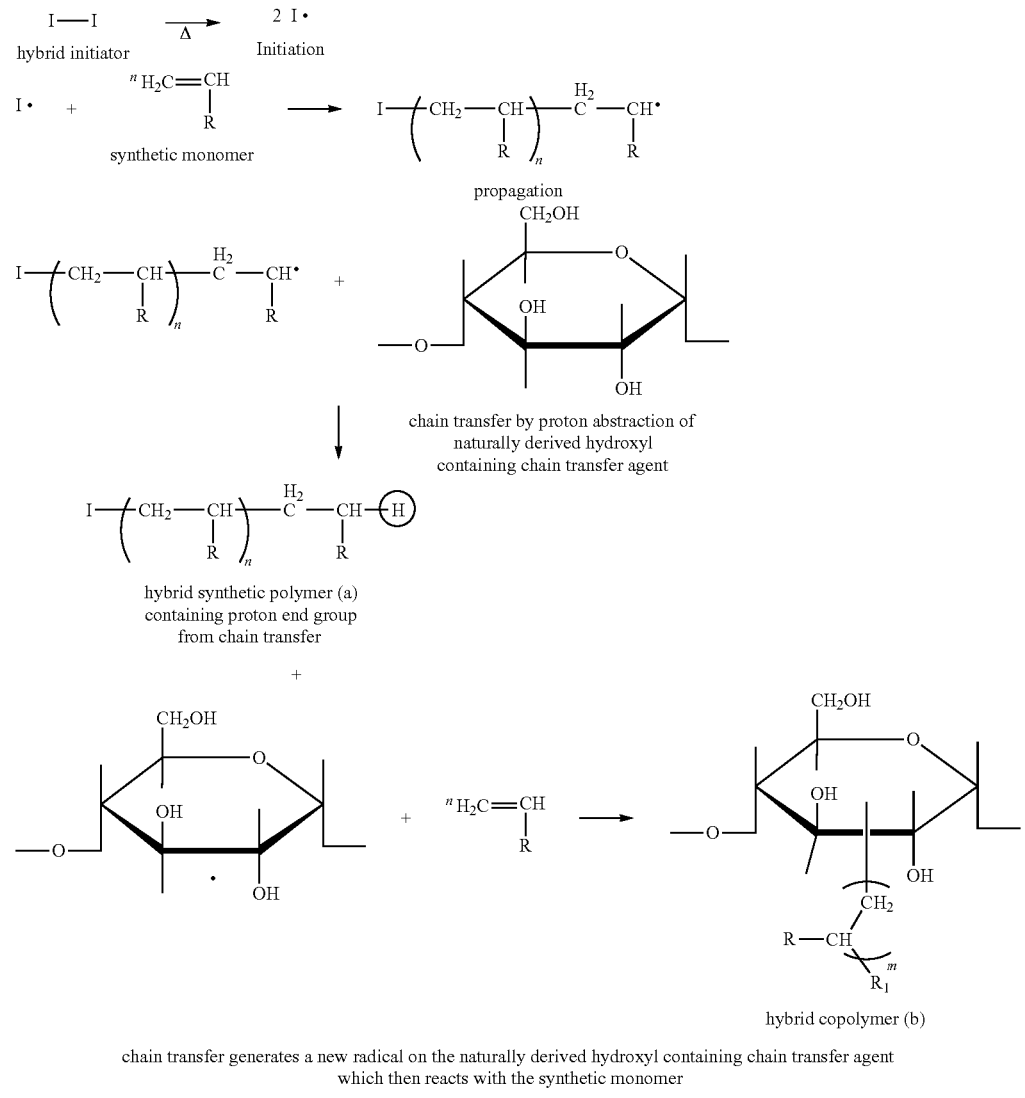

chain transfer generates a new radical on the naturally derived hydroxyl containing chain transfer agent which then reacts with the synthetic monomer Hybrid copolymer composition = mixture of (a) and (b) with a range of wt % of (a) in the composition That is, in the first step, the initiator I forms free radicals which reacts with the monomer and initiates the synthetic polymer chain. This then propagates by reacting with several monomer moieties. Termination is then by chain transfer which abstracts a proton from the naturally derived hydroxyl containing chain transfer agent. This terminates the hybrid synthetic polymer (a) and produces a free radical on the naturally derived hydroxyl containing chain transfer agent. The naturally derived hydroxyl containing chain transfer agent then reacts with several monomer moieties to form a species in which the naturally derived hydroxyl containing chain transfer agent is connected to the synthetic polymer chain. This species can then terminate by a chain transfer mechanism or reaction with an initiator fragment or by some other termination reaction such as combination or disproportionation reaction to produce the hybrid copolymer (b). If the termination is by chain transfer, then $R_1$ is H (abstracted from naturally derived hydroxyl containing chain transfer agent) and this generates a free radical on another chain transfer agent which can then initiate another chain.

Accordingly, as used herein and as shown in the above reaction, a "hybrid copolymer composition" is a mixture of (a) a hybrid synthetic copolymer and (b) a hybrid copolymer. The hybrid copolymer composition thus contains the two moieties, (a) and (b), with a minimum amount of the hybrid synthetic copolymers (a) since these components generates the chain transfer which leads to the formation of the hybrid copolymer (b). One skilled in the art will recognize that the hybrid copolymer composition may contain a certain amount of the unreacted naturally derived hydroxyl containing chain transfer agent.

The term "hybrid copolymer", as defined herein, refers to a copolymer of ethylenically unsaturated monomers with an end group containing the naturally derived hydroxyl containing chain transfer agent which is a result of the hybrid synthetic copolymer chain transfer. In an embodiment of the invention, the hybrid copolymer has the following structure:

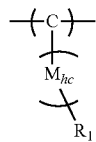

where C is a moiety derived from the naturally derived hydroxyl containing chain transfer agent, $M_{hc}$ is the synthetic portion of the hybrid copolymer derived from one or more ethylenically unsaturated monomers and $R_1$=H from chain transfer or I from reaction with the initiator radical or the naturally derived hydroxyl containing chain transfer agent formed by combination of two growing chains or another moiety formed from a termination reaction.

In an embodiment, the attachment point between C and $M_{hc}$ is through an aldehyde group in C which results in the linkage between C and $M_{hc}$ being a carbonyl moiety. In another embodiment, when the naturally derived hydroxyl containing chain transfer agent is a saccharide/polysaccharide with an aldehyde group as the reducing end group, then the hybrid copolymer can be represented by the structure:

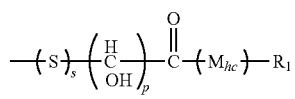

Where S is a saccharide repeat unit from the saccharide/polysaccharide chain transfer agent and s is an integer from 0 to 1000 and p is an integer that is 3, 4 or 5. In another embodiment, when the naturally derived hydroxyl containing chain transfer agent is an oxidized starch which contains aldehyde groups, the hybrid copolymer can be represented by the structure:

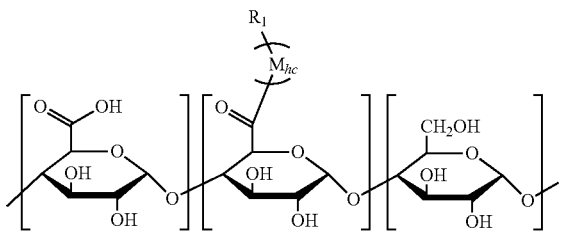

The amount of aldehyde functionality is preferably at least 0.001 mole %, more preferably at least 0.01 mole % and most preferably at least 0.1 mole % of the total anhydroglucose units in the saccharide/polysaccharide chain transfer agent.

Also as used herein, the term "hybrid synthetic copolymer" is a synthetic polymer derived from synthetic monomers with a hybrid initiator fragment as one end group. The other end group is a proton resulting from chain transfer to the naturally derived hydroxyl containing chain transfer agent. As used herein, the term "synthetic monomer" means any ethylenically unsaturated monomer which can undergo free radical polymerization.

In an embodiment of the invention, an exemplary hybrid synthetic copolymer has the following structure:

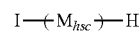

where I is the initiator fragment, H is the proton abstracted from the naturally derived hydroxyl containing chain transfer agent and $M_{hsc}$, is the synthetic portion of the hybrid synthetic copolymer derived from one or more ethylenically unsaturated monomers. One skilled in the art will recognize that if one or more ethylenically unsaturated monomers are used, the average composition of $M_{hsc}$ and $M_{hc}$ will be the same.

One skilled in the art will recognize, that the minimum amount of the hybrid synthetic copolymer will depend on the relative amounts of synthetic monomer, initiator and naturally derived hydroxyl containing chain transfer agent. Furthermore, in the hybrid copolymer composition, the amount (number of chains) of hybrid copolymer (b) will be greater than or equal to the number of chains of hybrid synthetic copolymer (a).

The molecular weight of each of the hybrid synthetic polymers is determined by the relative amounts of synthetic monomers, initiator and naturally derived hydroxyl containing chain transfer agent.

It has now been found that hybrid "dendrite" copolymers are produced by free radical polymerization of two or more synthetic monomers when the two or more synthetic monomers are polymerized sequentially to the naturally derived hydroxyl containing chain transfer agents. That is, a first ethylenically unsaturated synthetic monomer, synthetic monomer, $SM_1$, is polymerized in the presence of the naturally derived hydroxyl containing chain transfer agent, as shown in the illustration below.

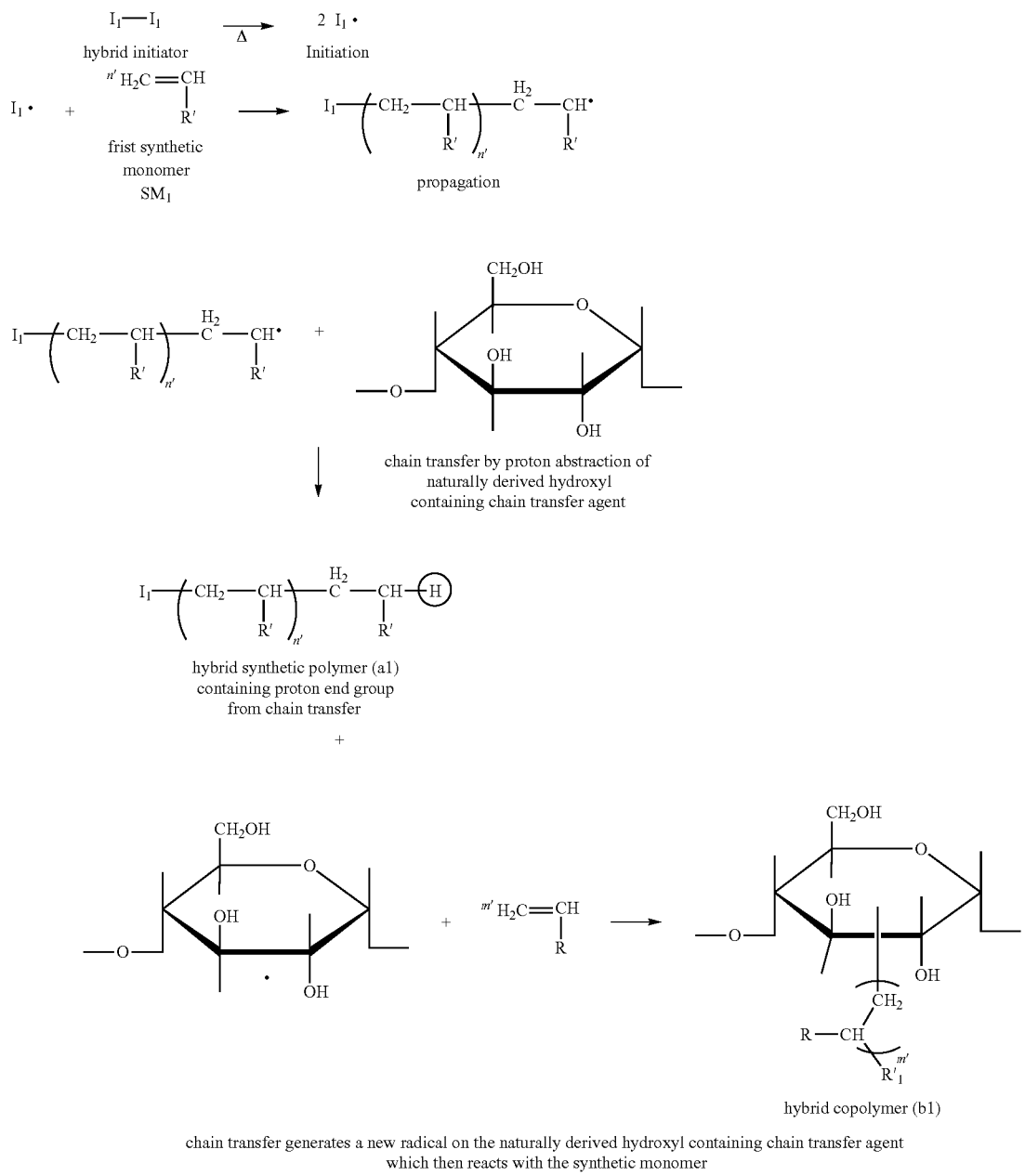

chain transfer generates a new radical on the naturally derived hydroxyl containing chain transfer agent which then reacts with the synthetic monomer where $I_1$ is the first initiator, n' is the average number of repeat units of $SM_1$ in hybrid synthetic polymer a1, $CH_2$—$CHR'$ is the moiety derived from the ethylenically unsaturated synthetic monomer, $SM_1$, and m' is the average number of repeat units of $SM_1$ in hybrid copolymer b1.

It should be noted that the reaction scheme above and below are presented for purposes of illustration, as a simplified example of the general reaction scheme to prepare the dendrite copolymers and dendrite copolymer compositions of the present invention. Accordingly, the structures depicted are not intended to limit the scope of the invention to only those ethylenically unsaturated monomers represented, but other ethylenically unsaturated monomers, such as disclosed throughout this application, may also be used.

Upon completion of the polymerization (and almost complete exhaustion of the first initiator, $I_1$, e.g. in an embodiment about 1% of the initiator feed is unreacted, and in another embodiment about 0.01% of the initiator feed is unreacted) and of the first ethylenically unsaturated monomer ($SM_1$), the second ethylenically unsaturated monomer $SM_2$ is added, along with additional initiator $I_2$. The first and second ethylenically unsaturated monomers $SM_1$ and $SM_2$ are different. However, the first and second initiator $I_1$ and $I_2$ and their concentrations relative to their respective synthetic monomers can be the same or different. In an embodiment, the amount of first ethylenically unsaturated monomer, $SM_1$, left unreacted before the start of the addition of the second ethylenically unsaturated monomer, $SM_2$, is about 0.1 to about 10% of the total synthetic monomer $SM_1$ added. This second ethylenically unsaturated monomer, synthetic monomer $SM_2$, is polymerized in the presence of the same naturally derived hydroxyl containing chain transfer agent, such as shown in the following illustration:

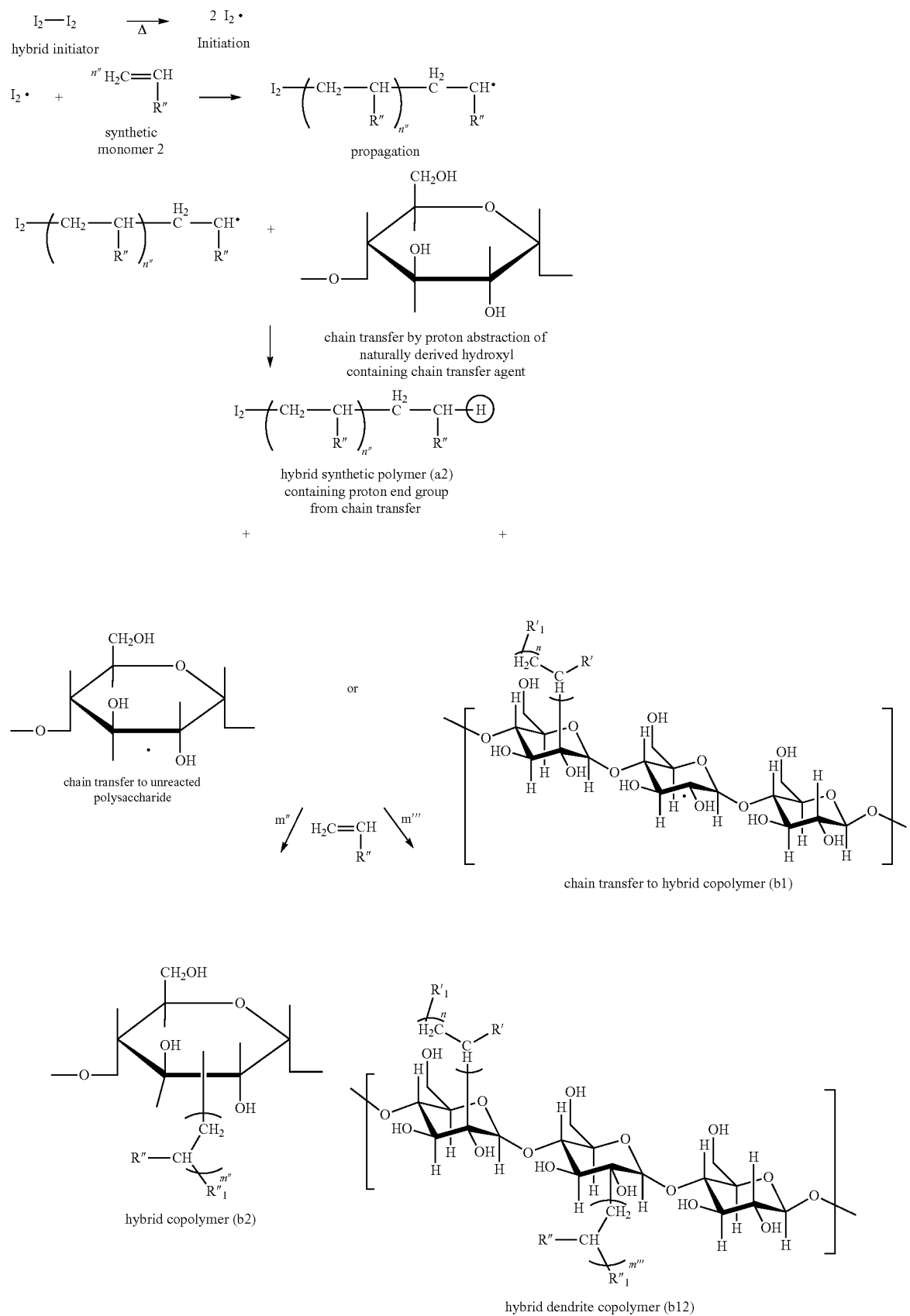

where $I_2$ is the second initiator, n" is the average number of repeat units of $SM_2$ in hybrid synthetic polymer a2, $CH_2$—$CHR'$ is the moiety derived from the ethylenically unsaturated synthetic monomer, $SM_2$, m" is the average number of repeat units of $SM_2$ in hybrid copolymer b2 and m'" is the average number of repeat units of $SM_2$ in hybrid dendrite copolymer b12. The dendrite hybrid copolymer composition, as shown above, thus may contain varying amounts of species a1, a2 and b1, b2 and b12, if 2 monomers are used. In an embodiment, the initiators used $I_1$ and $I_2$ may be the same or different. In another embodiment, the molar concentration of the initiators based on moles of monomer may be the same or different. One skilled in the art will recognize that the concentration of the initiator may be changed to modify the length of the synthetic moieties, namely, n', n", m', m" and m'". In an embodiment of the invention, the order of addition of the first and second synthetic monomers may be reversed. In an embodiment, the ethylenically unsaturated monomers may be a combination of one or more types chosen from anionic, non-ionic or cationic monomers where each ethylenically unsaturated monomer is of the same type or a different type. For example, in an embodiment, $SM_1$ and $SM_2$ are both anionic and the hybrid dendrite copolymer is multi-anionic. In another embodiment, $SM_1$ and $SM_2$ are both cationic and the hybrid dendrite copolymer is multi-cationic. In yet another embodiment, $SM_1$ and $SM_2$ are both nonionic and the hybrid dendrite copolymer is multi-nonionic. In still another embodiment, where $SM_1$ and $SM_2$ are different types of monomers, $SM_1$ may be anionic and $SM_2$ may be nonionic or cationic, in which instances, the hybrid dendrite copolymer may be anionic or amphoteric, respectively. In still yet another embodiment, where $SM_1$ and $SM_2$ are different types of monomers, $SM_1$ may be cationic and $SM_2$ may be nonionic or anionic, in which instances, the hybrid dendrite copolymer may be cationic or amphoteric, respectively.

Accordingly, in an aspect, the resulting hybrid dendrite copolymer composition will contain a hybrid "dendrite" copolymer containing both synthetic monomers as synthetic chains covalently bonded to the naturally derived hydroxyl containing chain transfer agent, with the proviso that each of these sequentially added monomers is attached to different, distinct locations of the naturally derived hydroxyl containing chain transfer agent. In addition to the hybrid dendrite copolymer, the hybrid dendrite copolymer composition may also include at least two synthetic hybrid polymers, such as described above, derived from each of the synthetic monomers utilized. Two hybrid copolymers, one for each of the first and second ethylenically unsaturated monomers introduced to form the hybrid dendrite copolymer, may also be included. That is, in an embodiment of the invention, the dendrite hybrid copolymer composition may be a mixture of a first hybrid synthetic copolymer (a1) and a second hybrid synthetic copolymer (a2), a first a hybrid copolymer (b1), a second hybrid copolymer (b2) and the hybrid dendrite copolymer (b12). The first hybrid synthetic copolymer (a1) represents the polymerization of the first sequential monomer added to the reaction, whereas the second hybrid synthetic copolymer (a2) represents the polymerization of the second sequential monomer added. Similarly, the first hybrid copolymer (b1) represents a polymerization product resulting from the first sequential monomer added to the reaction with the naturally derived hydroxyl containing material, whereas the second hybrid copolymer (b2) represents a polymerization product resulting from the second sequential monomer added and the naturally derived hydroxyl containing material. One skilled in the art will also recognize that the hybrid dendrite copolymer composition may contain a certain amount of the unreacted naturally derived hydroxyl containing chain transfer agent. In another embodiment, the dendrite hybrid copolymer composition may include a first a hybrid copolymer (b1) and/or a second hybrid copolymer (b2) and the hybrid dendrite copolymer (b12).

Since each successive monomer is added after the previous monomer has been completely reacted, it is also possible to add $SM_1$ and then $SM_2$ and then add more $SM_1$ again if needed.

In an embodiment, if three monomers say $SM_1$, $SM_2$, $SM_3$ are used then these three monomers can be added sequentially or alternatively two monomers can be added as a mixture and the third monomer can be added sequentially.

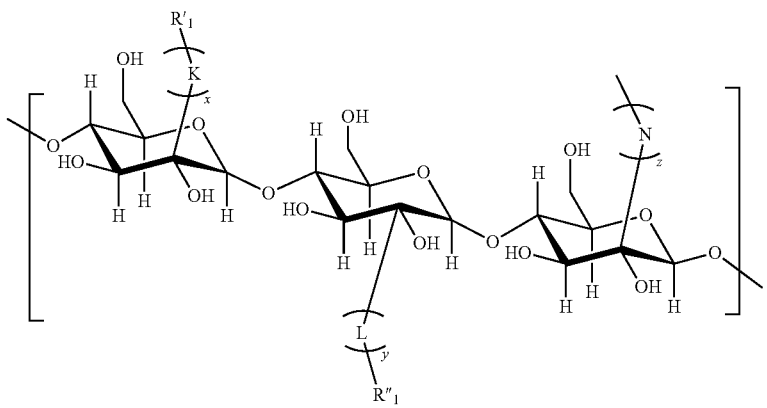

-continued

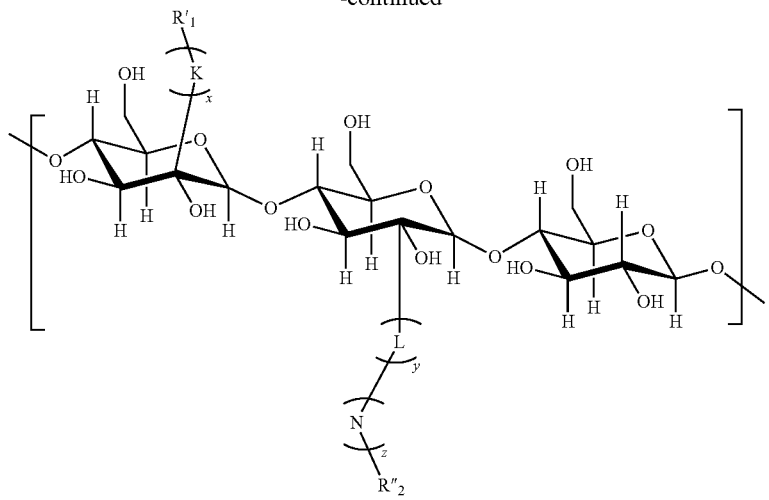

As shown above, N is the moiety derived from the third ethylenically unsaturated synthetic monomer $SM_3$. In this case, the hybrid dendrite copolymer composition will contain the corresponding synthetic hybrid copolymer, hybrid copolymers and a hybrid dendrite copolymer containing synthetic chains derived from one, two or all three monomers. One skilled in the art will recognize that 4 or monomers can be used and in such embodiments, several combinations of hybrid dendrite copolymers can be generated.

In an embodiment of the invention, the hybrid dendrite copolymer composition may be an anionic hybrid dendrite copolymer composition or a non-anionic dendrite copolymer composition. In an embodiment, the non-anionic hybrid dendrite copolymer composition may be cationic, nonionic, amphoteric or zwitterionic or mixtures thereof.

The term "hybrid dendrite copolymer", as defined herein, refers to a dendrite copolymer having moieties of two or more ethylenically unsaturated monomers $SM_1$ and $SM_2$ located on different chains, each with an end group containing the naturally derived hydroxyl containing chain transfer agent which is a result of the hybrid synthetic copolymer chain transfer. In an embodiment of the invention, the hybrid dendrite copolymer is believed to have the following structure:

number of repeat units of the second ethylenically unsaturated monomer $SM_2$ K is the moiety derived from the first ethylenically unsaturated synthetic monomer $SM_1$ and L is the moiety derived from the second ethylenically unsaturated synthetic monomer $SM_2$, $R'_1$ is the termination product from the polymerization and =H from chain transfer or $I_1$ from reaction with the initiator radical or the naturally derived hydroxyl containing chain transfer agent formed by combination of two growing chains or another moiety formed from a termination reaction, $R''_1$ is the termination product from the polymerization and =H from chain transfer or $I_2$ from reaction with the initiator radical or the naturally derived hydroxyl containing chain transfer agent formed by combination of two growing chains or another moiety formed from a termination reaction.

In an embodiment, in addition to K and L, the hybrid dendrite copolymer may optionally contain moieties derived from other monomers, so long as K and L are different. Optionally, in an embodiment of the present invention, the weight average molecular weight of the hybrid dendrite copolymer composition may be less than about 500,000, preferably less than 300,000 and most preferably less than 100,000. In an embodiment of the invention, the minimum weight average molecular weight of the natural component is 1000.

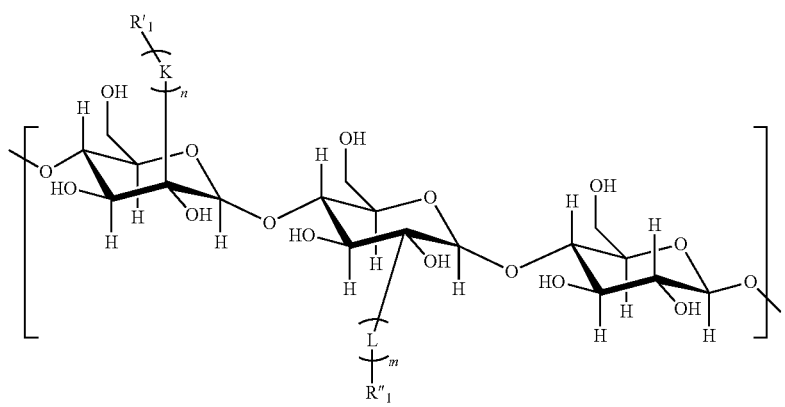

where n is the average number of repeat units of the first ethylenically unsaturated monomer $SM_1$, m is the average In a further embodiment, the hybrid dendrite copolymer composition is preferably a homogeneous water soluble copolymer composition and not a dispersion or emulsion copolymer composition. Unlike homogeneous water soluble copolymer compositions, dispersion or emulsion copolymer compositions comprise suspended or dispersed or emulsified polymer particles that are not water soluble. For purposes of the present application, water soluble is defined as having a solubility of greater than about 0.1 grams per 100 grams of water at 25° C. and preferably 1 gram per 100 grams of water at 25° C. and most preferably 10 grams per 100 grams of water at 25C.

In another embodiment, the hybrid synthetic copolymer will have a hybrid initiator fragment (I, $I_1$, $I_2$) and some of the hybrid dendrite copolymer chains will have a naturally derived hydroxyl containing chain transfer agent at one end and a hybrid initiator fragment (where $R_1$ is I). As used herein, the term "hybrid initiator fragment" is any fragment of the hybrid initiator that gets incorporated into the hybrid synthetic polymer derived from a hybrid initiator. "Hybrid initiators" are free radical initiators or initiating system excluding metal ion based initiators or initiating systems. The hybrid initiators preferably are not free radical abstractors but promote chain transfer. Furthermore, in an embodiment of the invention, the hybrid initiator is water soluble. Exemplary hybrid initiators include, but are not limited to, peroxides, azo initiators as well as redox systems like tert-butyl hydroperoxide and erythorbic acid, peroxide such as persulfate and an amine such as hydroxylamine sulfate, persulfate and sodium formaldehyde sulfoxylate etc. The hybrid initiators may include both inorganic and organic peroxides. Suitable inorganic peroxides include sodium persulfate, potassium persulfate and ammonium persulfate. Azo initiators, such as water soluble azo initiators, may also be suitable hybrid initiators. Water soluble azo initiators include, but are not limited to, 2,2'-Azobis[2-(2-imidazolin-2-yl)propane]dihydrochloride, 2,2'-Azobis[2-(2-imidazolin-2-yl)propane]disulfate dihydrate, 2,2'-Azobis(2-methylpropionamidine)dihydrochloride, 2,2'-Azobis[N-(2-carboxyethyl)-2-methylpropionamidine]hydrate, 2,2'-Azobis{2-[1-(2-hydroxyethyl)-2-imidazolin-2-yl]propane}dihydrochloride, 2,2'-Azobis[2-(2-imidazolin-2-yl)propane], 2,2'-Azobis(1-imino-1-pyrrolidino-2-ethylpropane)dihydrochloride, 2,2'-Azobis{2-methyl-N-[1,1-bis(hydroxymethyl)-2-hydroxyethyl]propionamide}, 2,2'-Azobis[2-methyl-N-(2-hydroxyethyl)propionamide] and others. One skilled in the art will recognize that the hybrid initiator fragment incorporated into the hybrid synthetic copolymer will depend on the hybrid initiator used. For example, sodium persulfate, potassium persulfate and ammonium persulfate will incorporate sulfate initiator fragments, whereas an azo initiator, such as 2,2'-Azobis(2-methylpropionamidine)dihydrochloride, will incorporate a 2-methyl propane propionamidine hydrochloride fragment. In an embodiment of the invention, the hybrid initiator fragment is not an OH moiety derived from hydrogen peroxide since hydrogen peroxide in the presence of a metal ion tends to abstract protons from a substrate and creates conventional graft copolymers. Furthermore, in an embodiment of the invention, the hybrid initiator fragment is water soluble.

In an embodiment, I is preferably 0.01 to 20 mole % of $M_{hc}+M_{hsc}$ and more preferably I is 0.1 to 15 mole % of $M_{hc}+M_{hsc}$ and most preferably I is 1 to 10 mole % of $M_{hc}+M_{hsc}$.

The term "naturally derived hydroxyl containing chain transfer agent" as used herein, means any hydroxyl containing materials obtained from a renewable source. In an embodiment of the invention, the naturally derived hydroxyl containing chain transfer agents include, but are not limited, to small molecules such as glycerol, citric acid, lactic acid, tartaric acid, gluconic acid, ascorbic acid, glucoheptonic acid. The naturally derived hydroxyl containing chain transfer agents may also include saccharides or derivatives thereof. Suitable saccharides include, for example, monosaccharides and disaccharides such as sugars for example glucose, fructose and maltose, as well as larger molecules such as oligosaccharides and polysaccharides (e.g., maltodextrins, corn syrups, and starches). Examples of these include sucrose, fructose, maltose, glucose and saccharose, as well as the reaction products of saccharides such as hydrogenation of starch hydrolysates such as mannitol, sorbitol maltitol and in particular hydrogenated corn syrups and maltodextrins and other reaction products, such as polydextrose. The oligosaccharides, polysaccharides, hydrogenated corn syrups and maltodextrins and polydextroses are preferred. One skilled in the art will recognize that the oligosaccharides and polysaccharides can be produced by a variety of methods including acid or enzyme hydrolysis or combinations thereof.

In embodiments of the invention, polysaccharides useful in the present invention further include pyrodextrins. Pyrodextrins are made by heating acidified, commercially dry starch to a high temperature. Extensive degradation occurs initially due to the usual moisture present in starch. However, unlike the above reactions that are performed in aqueous solution, pyrodextrins are formed by heating powders. As moisture is driven off by the heating, hydrolysis stops and recombination of hydrolyzed starch fragments occur. This recombination reaction makes these materials distinct from maltodextrins, which are hydrolyzed starch fragments. The resulting pyrodextrin product also has much lower reducing sugar content, as well as color and a distinct odor.

Use of natural materials to produce a hybrid dendrite copolymer composition is attractive since it minimizes the use of monomers derived from petrochemical sources since these monomers are in short supply. For example, small molecule natural alcohols like glycerols are by-products of biodiesel production. Glycerol is also a by-product of oils and fats used in the manufacture of soaps and fatty acids. It can also be produced by fermentation of sugar. Citric acid is produced industrially by fermentation of crude sugar solutions. Lactic acid is produced commercially by fermentation of whey, cornstarch, potatoes, molasses, etc. Tartaric acid is one byproduct of the wine making process. In an embodiment of the invention, the small molecule natural alcohol is glycerol.

In an embodiment of the invention, the naturally derived hydroxyl containing chain transfer agent is maltodextrin, pyrodextrin or a low molecular weight starch or oxidized starch. It has been found that the chain transfer reaction does not work well when the naturally derived hydroxyl containing chain transfer agent is not soluble in the reaction system. For example, high molecular weight starches, such as those having molecular weights in the millions or those in granular form, are water dispersable and not water soluble. Accordingly, in embodiments of the invention, the average molecular weight of the chain transfer agent is preferably less than about 500,000 based on a starch standard. Starches having such exemplary molecular weights are water soluble. In another embodiment, the weight average molecular weight (Mw) of the chain transfer agent may be less than about 100,000. In yet another preferred embodiment, the weight average molecular weight of the chain transfer agent may be less than about 50,000. In yet another preferred embodiment, the weight average molecular weight of the chain transfer agent may be less than about 10,000. It has also been determined that for applications in which dispersancy and scale control is particularly desirable, a lower molecular weight, such as 10,000, of the chain transfer agent provides improved performance.

The molecular weight of the polysaccharide was determined by the procedure outlined below:

Eluent: 0.025M $NaH_2PO_4$, 0.025 M $Na_2HPO_4$ and 0.01M of Sodium Azide in HPLC grade water. This solution was filtered through a 0.2 μm filter.

Columns: 1×G6000PW×1 7.8 mm×30 cm,G4000PW×1 7.8×30 cm, G3000PW×1

7.8 mm×30 cm, Guard column is TSKgel Guard PW×1 6.0 mm×4 cm (all made by Tosoh Bioscience)

The column bank was controlled to 5° C. above ambient temperature. Usually 30° C.

Flow Rate: 1.0 ml/min

Detector: Refractive Index, Waters® Model 2414 Temperature controlled to 30° C.

Pump/Autosampler: Waters® e2695 Separation Module. Sample compartment temperature controlled to 25° C.

Primary Standards: HETA (Hydroxyethylstarch). Available from American Polymer Standards Corporation. (www.ampolymer.com) 5 standards. Prepare a 0.1% w/w in the mobile phase of each of the following:

| 1. | Mw 9,600   | Mn 5,400  |
|----|------------|-----------|
| 2. | Mw 25,900  | Mn 10,600 |
| 3. | Mw 51,100  | Mn 34,300 |
| 4. | Mw 114,300 | Mn 58,000 |
| 5. | Mw 226,800 | Mn 95,900 |

Sample Preparation: The samples were prepared by dissolving the polymer in the mobile phase at a 0.1% concentration.

Injection Volume: 450 μl for the standard and sample.

The standards are injected and a first or second order calibration curve is built.

The curve with the best fit and within the range of the molecular weight of the unknown sample was then chosen.

Software: Empower® 2 by Waters Corporation

A calibration curve is first built with the samples of the standards. The molecular weight of the unknown sample is then determined by comparing its elution time with the elution time of the standards.

Polysaccharides useful in the present invention can also be derived from plant, animal and microbial sources. Examples of such polysaccharides include starch, cellulose, gums (e.g., gum arabic, guar and xanthan), alginates, pectin and gellan. Starches include those derived from maize and conventional hybrids of maize, such as waxy maize and high amylose (greater than 40% amylose) maize, as well as other starches such as potato, tapioca, wheat, rice, pea, sago, oat, barley, rye, and amaranth, including conventional hybrids or genetically engineered materials. Also included are hemicellulose or plant cell wall polysaccharides such as d-xylans. Examples of plant cell wall polysaccharides include arabinoxylans such as corn fiber gum, a component of corn fiber.

When the polysaccharide is a gum, applicable bases that can be used herein include polygalactomannans (heteropolysaccharides composed principally of long chains of β-D-mannopyranosyl units to which single unit side chains of α-D-galactopyranosyl units are joined). Also included are degraded gum products resulting from the hydrolytic action of acid, heat, shear and/or enzyme; oxidized gums; and derivatized gums. Suitable gum bases include guar, locust bean, tara and fenugreek gums.

Other suitable polysaccharide bases useful in the present invention include, for example, pullulan, chitin, chitosan, gum arabic, agar, algin, carrageenan, xanthan, gellan, welan, rhamsan, curdlan scleroglucan, tamarind gum, and hemicelluloses such as arabinogalactans and corn fiber gum and their derivatives.

When the polysaccharide is cellulose, applicable bases useful herein include cellulose and cellulose derivatives such as water soluble cellulose ethers (e.g., carboxymethylcellulose and alkyl and hydroxyalkylcelluloses such as methylcellulose, hydroxypropyl methylcellulose, hydroxyethyl cellulose, hydroxyethyl methylcellulose, hydroxybutyl methylcellulose, and ethyl hydroxyethyl cellulose).

Suitable polysaccharides should preferably be water soluble during the reaction. This implies that the polysaccharides either have a molecular weight low enough to be water soluble or can be hydrolyzed in situ during the reaction to become water soluble. For example, non-degraded starches are not water soluble. However, degraded starches are water soluble and are preferred. Furthermore, water solubility may be achieved by chemical modification for example cellulose to carboxymethyl cellulose.

In an embodiment of the invention, degraded polysaccharides according to the present invention can have a number average molecular weight of about 100,000 or lower. In an embodiment, the number average molecular weight (Mn) of the sulfonated hybrid dendrite copolymer is about 25,000 or less. In another aspect, the degraded polysaccharides have a number average molecular weight of about 10,000 or less.

In an embodiment of the invention, the naturally derived hydroxyl containing chain transfer agent is a polysaccharide comprising maltodextrin. Maltodextrins are polymers having d-glucose units linked primarily by α-1,4 bonds and a dextrose equivalent ('DE') of about 20 or less. Dextrose equivalent is a measure of the extent of starch hydrolysis. It is determined by measuring the amount of reducing sugars in a sample relative to dextrose (glucose). The DE of dextrose is 100, representing 100% hydrolysis. The DE value gives the extent of hydrolysis (e.g., 10 DE is more hydrolyzed than 5 DE maltodextrin). Maltodextrins are available as a white powder or concentrated solution and are prepared by the partial hydrolysis of starch with acid and/or enzymes.

Polysaccharides useful in the present invention can further include corn syrups. Corn syrups are defined as degraded starch products having a DE of 27 to 95. Examples of specialty corn syrups include high fructose corn syrup and high maltose corn syrup. Monosaccharides and oligosaccharides such as galactose, mannose, sucrose, maltose, fructose, ribose, trehalose, lactose, etc., can be used.

In an embodiment of the invention, the polysaccharide has a DE of about 65 or less, 45 or less, 20 or less, in another embodiment a DE of about 15 or less and in still another embodiment a DE of about 5 or less. In an embodiment, the polysaccharide has a DE with a range having a lower limit of at least about 1.

As noted above, the naturally derived hydroxyl containing chain transfer agents also may include cellulose and its derivatives, but they may also include inulin and its derivatives, such as carboxymethyl inulin. The cellulosic derivatives include plant heteropolysaccharides commonly known as hemicelluloses which are by products of the paper and pulp industry. Hemicelluloses include xylans, glucuronoxylans, arabinoxylans, arabinogalactans glucomannans, and xyloglucans. Xylans are the most common heteropolysaccharide and are preferred. Furthermore, these naturally derived hydroxyl containing chain transfer agents also include lignin and its derivatives, such as lignosulfonates In an embodiment of the invention, cellulosic derivatives such as heteropolysaccharides such as xylans and lignin and its derivatives may be present in an amount of from about 0.1% to about 98% by weight, based on the total amount of the hybrid dendrite copolymer. In an embodiment of this invention the naturally derived chain transfer agents may be maltodextrins, pyrodextrins and chemically modified versions of maltodextrins and pyrodextrins. In another embodiment, the naturally derived chain transfer agent may be cellulose or inulin or chemically modified cellulose such as carboxymethyl cellulose, hydroxy ethyl cellulose, hydroxylpropyl cellulose, and ethyl/methyl derivatives of these celluloses or inulin or carboxy methyl inulin or a heteropolysaccharide such as xylan or a lignin derivative, such as lignosulfonate. In the case of cellulose or chemically modified celluloses, they are depolymerized to low molecular weights before being used to synthesize the hybrid dendrite copolymer compositions of this invention.

The naturally derived hydroxyl containing chain transfer agents can be used as obtained from their natural source or they can be chemically modified. Chemical modification includes hydrolysis by the action of acids, enzymes, oxidizers or heat, esterification or etherification. The modified naturally derived chain transfer agents, after undergoing chemical modification may be cationic, anionic, non-ionic or amphoteric or hydrophobically modified. Such chemical modifications and the like pertaining to the naturally derived hydroxyl containing chain transfer agents are detailed in US Patent application publication number US 2007-0021577 A1, which is incorporated by reference in its entirety herein. Accordingly, the hydroxyl-containing naturally derived materials suitable for use in the present invention include oxidatively, hydrolytically or enzymatically degraded monosaccharides, oligosaccharides and polysaccharides, as well as chemically modified monosaccharides, oligosaccharides and polysaccharides. Chemically modified derivatives include carboxylates, sulfonates, phosphates, phosphonates, aldehydes, silanes, alkyl glycosides, alkyl-hydroxyalkyls, carboxy-alkyl ethers and other derivatives. The polysaccharide can be chemically modified before, during or after the polymerization reaction.

In an embodiment of the invention, polysaccharides can be modified or derivatized by etherification (e.g., via treatment with propylene oxide, ethylene oxide, 2,3-epoxypropyl trimethyl ammonium chloride), esterification (e.g., via reaction with acetic anhydride, octenyl succinic anhydride ('OSA')), acid hydrolysis, dextrinization, oxidation or enzyme treatment (e.g., starch modified with α-amylase, β-amylase, pullanase, isoamylase or glucoamylase), or various combinations of these treatments. These treatments can be performed before or after the polymerization process.

The polysaccharides can be modified with cationic, anionic, amphoteric, zwitterionic, hydrophobic and nonionic groups, as well as combinations of such groups. Modification of the starch can be carried out by well known chemical reactions with reagents containing groups such as amino, imino, ammonium, sulfonium or phosphonium groups as disclosed, for example, in Modified Starches Properties and Uses, (1986). Such derivatives include those containing nitrogen containing groups comprising primary, secondary, tertiary and quaternary amines, as well as sulfonium and phosphonium groups attached through either ether or ester linkages.

Virtually any ethylenically unsaturated monomer or polymerizable monomer can be used as synthetic monomers ($SM_1$, $SM_2$, $SM_3$ . . . $SM_n$) to produce the hybrid dendrite copolymer compositions of the present invention. Monomers which promote water solubility or water dispersabilty of the final product are preferred. Furthermore, there is essentially no limit on the number of monomers that can be used.

In an embodiment of the invention, the ethylenically unsaturated monomer is anionic. Accordingly, the dendrite hybrid copolymer comprises a synthetic polymer produced from at least one anionic ethylenically unsaturated monomer that is chain terminated, or has an end group, with a naturally derived hydroxyl containing chain transfer agent. In a further aspect of the present invention the hybrid dendrite copolymer contains a polymer produced from at least one anionic ethylenically unsaturated monomer linked to the naturally derived hydroxyl containing chain transfer agent via a carbonyl moiety.

As used herein, the term "anionic ethylenically unsaturated monomer" means an ethylenically unsaturated monomer which is capable of introducing a negative charge to the dendrite hybrid copolymer. These anionic ethylenically unsaturated monomers can include, but are not limited to, acrylic acid, methacrylic acid, ethacrylic acid, α-chloroacrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid and its sodium salt (AMPS), vinyl sulfonic acid, sodium methallyl sulfonate, sulfonated styrene, (meth) allyloxybenzene sulfonic acid, vinyl phosphonic acid, sodium 1-allyloxy 2 hydroxy propyl sulfonate and maleic acid and their salts. Moieties such as maleic anhydride or acrylamide that can be derivatized (hydrolyzed) to moieties with a negative charge are also suitable. Combinations of anionic ethylenically unsaturated monomers can also be used. In an embodiment of the invention, the anionic ethylenically unsaturated monomer may be acrylic acid, maleic acid, methacrylic acid, itaconic acid, 2-acrylamido-2-methyl propane sulfonic acid and their salts or mixtures of the above-described monomers. In an embodiment of the invention, the first synthetic monomer $SM_1$ is acrylic acid, itaconic acid, maleic acid, methacrylic acid or its salts or combinations thereof and the second synthetic monomer, $SM_2$, is 2-acrylamido-2-methyl propane sulfonic acid or its salts.

Suitable synthetic monomers for use in the present invention may also optionally include hydrophobic monomers. These hydrophobic monomers may be used in amounts such that the resulting dendrite copolymer composition is still water soluble. These hydrophobic monomers include saturated or unsaturated alkyl, hydroxyalkyl, alkylalkoxy groups, arylalkoxy, alkarylalkoxy, aryl and aryl-alkyl groups, siloxane etc. Examples of hydrophobic monomers include styrene, α-methyl styrene, methyl methacrylate, methyl acrylate, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenyl butyl) styrene. The hydrophobic monomers include those containing silane groups such as vinyl trimethoxy silane, vinyl triethoxy silane, vinyl triisopropoxy silane, vinyl triacetoxy silane, vinyl tris (2 ethoxymethoxy) silane, vinyl methyl dimethoxy silane, gamma methacryloxypropyltrimethoxy silane and others. One skilled in the art will recognize that these silane monomers can be hydrolyzed to silanol groups which are useful in this invention.

In another aspect, the present invention relates to hybrid dendrite copolymer compositions that contain at least one non-anionic ethylenically unsaturated monomer. As used herein, non-anionic ethylenically unsaturated monomers include those that are not anionic. That is, these non-anionic ethylenically unsaturated monomers may include, but are not limited to, cationic ethylenically unsaturated monomers, nonionic ethylenically unsaturated monomers, amphoteric ethylenically unsaturated monomers and zwitterionic enthylenically unsaturated monomers and mixtures thereof. A non-anionic hybrid dendrite copolymer composition, as used herein, is a mixture of a hybrid synthetic copolymer produced from at least one cationic ethylenically unsaturated monomer or at least one nonionic ethylenically unsaturated monomer and a hybrid dendrite copolymer that comprises a synthetic polymer produced from at least one cationic ethylenically unsaturated monomer or at least one nonionic ethylenically unsaturated monomer that is chain terminated, or has an end group, with a naturally derived hydroxyl containing chain transfer agent.

As used herein, the term "cationic ethylenically unsaturated monomer" means an ethylenically unsaturated monomer which is capable of introducing a positive charge to the non-anionic hybrid copolymer composition. Examples of cationic monomers include, but are not limited to, acrylamidopropyltrimethyl ammonium chloride (APTAC), methacrylamidopropyltrimethyl ammonium chloride (MAPTAC), diallyldimethyl ammonium chloride (DADMAC), acryloyloxyethyl trimethyl ammonium chloride (AETAC), methacryloyloxyethyl trimethyl ammonium chloride (also known as dimethyl amino ethyl methacrylate methyl chloride quaternary). In an embodiment of the present invention, the cationic ethylenically unsaturated monomer has at least one amine functionality. Cationic derivatives of these non-anionic hybrid dendrite copolymer compositions may be formed by forming amine salts of all or a portion of the amine functionality, by quaternizing all or a portion of the amine functionality to form quaternary ammonium salts, or by oxidizing all or a portion of the amine functionality to form N-oxide groups.

As used herein, the term "amine salt" means the nitrogen atom of the amine functionality is covalently bonded to from one to three organic groups and is associated with an anion.

As used herein, the term "quaternary ammonium salt" means that a nitrogen atom of the amine functionality is covalently bonded to four organic groups and is associated with an anion. These cationic derivatives can be synthesized by functionalizing the monomer before polymerization or by functionalizing the polymer after polymerization. These cationic ethylenically unsaturated monomers include, but are not limited to, N,N dialkylaminoalkyl(meth)acrylate, N,N dialkylaminoalkylacrylate, N-alkylaminoalkyl(meth) acrylate, N,N dialkylaminoalkylacrylmide N,N dialkylaminoalkyl(meth)acrylamide and N-alkylaminoalkyl(meth) acrylamide, where the alkyl groups are independently $C_{1-18}$ cyclic compounds such as 1-vinyl imidazole and the like.

Aromatic amine containing monomers, such as vinyl pyridine may also be used. Furthermore, monomers such as vinyl formamide, vinyl acetamide and the like which generate amine moieties on hydrolysis may also be used. Preferably the cationic ethylenically unsaturated monomer is N,N-dimethylaminoethyl methacrylate, tert-butylaminoethylmethacrylate and N,N-dimethylaminopropyl methacrylamide. In an embodiment of the invention, the amine monomer is chosen from N,N-dimethylaminoethyl methacrylate, N,N-dimethylaminopropyl methacrylamide, and N,N-diethylaminoethyl methacrylate. In an embodiment, the vinyl pyridine and other amine monomers can be oxidized or quaternized.

Cationic ethylenically unsaturated monomers that may be used are the quarternized derivatives of the above monomers as well as diallyldimethylammonium chloride also known as dimethyldiallylammonium chloride, (meth)acrylamidopropyl trimethylammonium chloride, 2-(meth)acryloyloxy ethyl trimethyl ammonium chloride, 2-(meth)acryloyloxy ethyl trimethyl ammonium methyl sulfate, 2-(meth)acryloyloxyethyltrimethyl ammonium chloride, N,N-Dimethylaminoethyl (meth)acrylate methyl chloride quaternary, methacryloyloxy ethyl betaine as well as other betaines and sulfobetaines, 2-(meth)acryloyloxy ethyl dimethyl ammonium hydrochloride, 3-(meth)acryloyloxy ethyl dimethyl ammonium hydroacetate, 2-(meth)acryloyloxy ethyl dimethyl cetyl ammonium chloride, 2-(meth)acryloyloxy ethyl diphenyl ammonium chloride and others. In an embodiment, cationic ethylenically unsaturated monomers suitable for use in the present invention are the quarternized derivatives of N,N dialkylaminoalkyl(meth)acrylate, N,N dialkylaminoalkylacrylate, N,N dialkylaminoalkylacrylamide and N,N dialkylaminoalkyl(meth)acrylamide, One skilled in the art will recognize that these can be quaternized with methyl chloride (as mentioned above), but they may also be quaternized with dimethylsulfate, diethyl sulfate, ethyl chloride and benzyl chloride and other quaternizing agents.

In an embodiment of the invention, when at least one of the ethylenically unsaturated monomers is cationic, the dendrite copolymer composition is substantially free of acrylamide or methacrylamide. Substantially free means that the dendrite copolymer composition contains less than about 1% of these monomers, preferably less than about 0.1% of these monomers and most preferably less than about 0.001% of these monomers. While in this embodiment, the dendrite copolymer composition is substantially free of acrylamide or methacrylamide, the dendrite copolymer composition may contain derivatives of acrylamide or methacrylamide such as N,N dimethylacrylamide and other derivatives mentioned in this application.

In another embodiment of the invention, when at least one of the ethylenically unsaturated monomers is cationic, the copolymer composition comprises about 20 weight percent or greater of the cationic ethylenically unsaturated monomer based on the weight of the dendrite copolymer composition. In a further embodiment, the copolymer composition comprises about 25 weight percent or greater of the cationic ethylenically unsaturated monomer, and in yet another embodiment, the copolymer composition comprises about 30 weight percent or greater of the cationic ethylenically unsaturated monomer, In still yet another embodiment, when at least one of the ethylenically unsaturated monomers is cationic, the copolymer composition is substantially free of a crosslinking agent. Substantially free means that the dendrite copolymer composition contains less than about 1% of a crosslinking agent, preferably less than about 0.1% of a crosslinking agent and most preferably less than about 0.001% of a crosslinking agent.

As used herein, the term "nonionic ethylenically unsaturated monomer" means an ethylenically unsaturated monomer which does not introduce a charge in to the non-anionic hybrid copolymer composition. These nonionic ethylenically unsaturated monomers include, but are not limited to, $C_1$-$C_6$ alkyl esters of (meth)acrylic acid and the alkali or alkaline earth metal or ammonium salts thereof, acrylamide and the $C_1$-$C_6$ alkyl-substituted acrylamides, the N-alkyl-substituted acrylamides and the N-alkanol-substituted acrylamides, hydroxyl alkyl acrylates and acrylamides. Also suitable are the $C_1$-$C_6$ alkyl esters and $C_1$-$C_6$ alkyl half-esters of unsaturated vinylic acids, such as maleic acid and itaconic acid, and $C_1$-$C_6$ alkyl esters of saturated aliphatic monocarboxylic acids, such as acetic acid, propionic acid and valeric acid. In embodiment, the nonionic ethylenically unsaturated monomer is chosen from acrylamide, methacrylamide, N alkyl(meth)acrylamide, N,N dialkyl(meth)acrylamide such as N,N dimethylacrylamide, hydroxyalkyl (meth)acrylates, alkyl(meth)acrylates such as methylacrylate and methylmethacrylate, vinyl acetate, vinyl morpholine, vinyl pyrrolidone, vinyl caprolactum, ethoxylated alkyl, alkaryl or aryl monomers such as methoxypolyethylene glycol (meth)acrylate, allyl glycidyl ether, allyl alcohol, glycerol (meth)acrylate, monomers containing silane, silanol and siloxane functionalities and others. The nonionic ethylenically unsaturated monomer is preferably water soluble. In a further embodiment, the nonionic ethylenically unsaturated monomer is chosen from acrylamide, methacrylamide, N methyl(meth)acrylamide, N,N dimethyl (meth)acrylamide, methyl methacrylate, methyl acrylate, hydroxyethyl (meth)acrylate and hydroxypropyl (meth) acrylate, N,N dimethylacrylamide, N,N diethylacrylamide, N-isopropylacrylamide and acryloyl morpholin vinyl pyrrolidone and vinyl caprolactum.

In an embodiment of the invention, the first synthetic monomer, $SM_1$, is anionic and is acrylic acid, itaconic acid, maleic acid, methacrylic acid, 2-acrylamido-2-methyl propane sulfonic acid or its salts and the second monomer, $SM_2$, is cationic and is methacrylamidopropyltrimethyl ammonium chloride (MAPTAC), diallyldimethyl ammonium chloride (DADMAC), acryloyloxyethyl trimethyl ammonium chloride (AETAC), methacryloyloxyethyl trimethyl ammonium chloride or combinations thereof.

In another aspect, the invention relates to a process to produce the hybrid dendrite copolymer composition. The process comprises polymerizing at least one first ethylenically unsaturated monomer in the presence of a naturally derived hydroxyl containing chain transfer agent until the reaction is substantially complete, for example when less than 10%, and in another embodiment less than 1%, of the at least one first monomer is left unreacted and then polymerizing at least one second ethylenically unsaturated monomer in the presence of the reaction product of the first monomer and the naturally derived hydroxyl containing chain transfer agent. In another aspect, the invention is directed to the product produced by the aforementioned process.

In an embodiment of the invention, the hybrid dendrite copolymer compositions may contain 1 to 99.5 weight percent of the naturally derived hydroxyl containing chain transfer agent based on the weight of the hybrid dendrite copolymer composition. In another embodiment, the dendrite hybrid copolymer compositions may contain at least 10 weight percent, preferably 50 weight percent and most preferably 75 weight percent of the naturally derived hydroxyl containing chain transfer agent based on the weight of the hybrid dendrite copolymer composition In another embodiment, the dendrite hybrid copolymer compositions may contain at most 99.5 weight percent, preferably 95 weight percent and most preferably 90 weight percent of the naturally derived hydroxyl containing chain transfer agent based on the weight of the hybrid dendrite copolymer composition.

In embodiments of the invention the hybrid dendrite copolymer composition can be used as a constituent of a composition for a number of different applications including, but not limited to, cleaning, laundry, automatic dish washing (ADW), superabsorbent, fiberglass binder, rheology modifier, oil field, water treatment, dispersant, cementing and concrete compositions. For cleaning applications, the compositions may include, but are not limited to, detergent, fabric cleaner, automatic dishwashing detergent, rinse aids, glass cleaner, fabric care formulation, fabric softener, flocculants, coagulants, emulsion breakers, alkaline and acidic hard surface cleaners, laundry detergents and others. The compositions can also be used to clean surfaces in industrial and institutional cleaning applications. In an exemplary embodiment for automatic dishwashing detergent formulations, such formulations include phosphate, low phosphate and "zero" phosphate built formulations, in which the detergent is substantially free of phosphates. As used herein, low phosphate means less than 1500 ppm phosphate in the wash, in another embodiment less than about 1000 ppm phosphate in the wash, and in still another embodiment less that 500 ppm phosphate in the wash.

The hybrid dendrite copolymer compositions can also be used as scale control agents in cleaning, laundry, ADW, oil field, water treatment, and in any other aqueous system where scale buildup is an issue. The scales controlled include, but are not limited to, carbonate, sulfate, phosphate or silicate based scales such as calcium sulfate, barium sulfate, calcium ortho and polyphosphate, tripolyphosphate, magnesium carbonate, magnesium silicate and others.

In further embodiments, the hybrid dendrite copolymer compositions can also be used as dispersants in cleaning, oil field and water treatment applications, paint and coatings, paper coatings and other applications. These hybrid dendrite copolymer compositions can be used to disperse particulates including, but not limited to, minerals, clays, salts, metallic ores, metallic oxides, dirt, soils, talc, pigments, titanium dioxide, mica, silica, silicates, carbon black, iron oxide, kaolin clay, calcium carbonate, synthetic calcium carbonates, precipitated calcium carbonate, ground calcium carbonate, precipitated silica, kaolin clay or combinations thereof.

Suitable adjunct ingredients for use in the present invention include, but are not limited to, water, surfactants, builders, phosphates, sodium carbonate, citrates, enzymes, buffers, perfumes, anti-foam agents, ion exchangers, alkalis, anti-redeposition materials, optical brighteners, fragrances, dyes, fillers, chelating agents, fabric whiteners, brighteners, sudsing control agents, solvents, hydrotropes, bleaching agents, bleach precursors, buffering agents, soil removal agents, soil release agents, fabric softening agent, opacifiers, water treatment chemicals, corrosion inhibitors, orthophosphates, zinc compounds, tolyltriazole, minerals, clays, salts, metallic ores, metallic oxides, talc, pigments, titanium dioxide, mica, silica, silicates, carbon black, iron oxide, kaolin clay, modified kaolin clays, calcium carbonate, synthetic calcium carbonates, fiberglass, cement and aluminum oxide. The surfactants can be anionic, non-ionic, such as low foaming non-ionic surfactants, cationic or zwitterionic. In an embodiment of the invention, the chelants may be glutamic acid N,N-diacetic acid (GLDA) and methylglycine N,N-diacetic acid (MGDA) and the like.

Some other oil field uses for the hybrid dendrite copolymer compositions of this invention include additives in cementing, drilling muds, dispersancy and spacer fluid applications. Often, the water encountered in oil field applications is sea water or brines from the formation. The water encountered in the oilfield can be very brackish. Hence, the polymers may also desirably be soluble in many brines and brackish waters. These brines may be sea water which contains about 3.5 percent NaCl by weight or more severe brines that contain, for example, up to 3.5% KCl, up to 25% NaCl and up to 20% $CaCl_2$. Therefore, the polymers should be soluble in these systems for them to be effective as, for example, scale inhibitors. It has further been found that the higher the solubility of the hybrid dendrite copolymer compositions in the brine, the higher the compatibility. The composition of synthetic seawater, moderate and severe calcium brines which are typical brines encountered in the oilfield is listed in Table 1 below.

TABLE 1

Typical brines encountered in the oilfield.
Brine preparation

| | grams per liter | | | ppm | | |
|---|---|---|---|---|---|---|
| Brine number and description | NaCl | $CaCl_2 \cdot 2H_2O$ | $MgCl_2 \cdot 6H_2O$ | Na | Ca | Mg |
| 1 synthetic seawater | 24.074 | 1.61 | 11.436 | 9471 | 439 | 1368 |
| 2 moderate calcium brine | 63.53 | 9.19 | | 24992 | 2506 | 0 |
| 3 severe calcium brine | 127.05 | 91.875 | | 49981 | 25053 | 0 |

As described in Table 1, sea water contains around 35 grams per liter of a mixture of salts. The moderate and severe calcium brines contain around 70 and 200 grams per liter of a mixture of salts respectively.

In oil field applications, the scale inhibitor may be injected or squeezed or may be added topside to the produced water. Accordingly, embodiments of the invention also include mixtures of the hybrid dendrite copolymer and a carrier fluid. The carrier fluid may be water, glycol, alcohol or oil. Preferably, the carrier fluid is water or brines or methanol. Methanol is often used to prevent the formation of methane hydrate (also known as methane clathrate or methane ice) structures downhole. In another embodiment of this invention, the hybrid dendrite copolymers may be soluble in methanol. Thus, the scale inhibiting polymers can be introduced in to the well bore in the methanol line. This is particularly advantageous since there is fixed number of lines that run in to the wellbore and this combination eliminates the need for another line.

In an embodiment of the invention the hybrid dendrite copolymer compositions can be uniformly mixed or blended with builders or chelating agents and then processed into powders or granules. For example, compositions including the hybrid dendrite copolymer compositions of the present invention may include alkali metal or alkali-metal earth carbonates, citrates or silicates as exemplary builders suitable for use in detergent formulations. The term alkali metals are defined as the Group IA elements, such as lithium, sodium and potassium, whereas the alkali-metal earth metals are the Group IIA elements which include beryllium, magnesium and calcium.

Powders as used herein are defined as having an average particle size of less than about 300 microns, whereas granules are particles of an average size of greater than about 300 microns. By uniformly mixing or blending the hybrid dendrite copolymer with the builder or chelating agent, the particles or granules provide less hygroscopic properties and afford easier handling and free flowing powders. Free flowing as used in this application are powders or granules that do not clump or fuse together. In an embodiment of this invention, the hybrid polymer is an anionic hybrid copolymer. In another embodiment of this invention, the builders or chelating agents that can be blended with the hybrid dendrite copolymer are sodium or potassium carbonate, sodium or potassium silicate sodium or potassium citrate or glutamic acid N,N-diacetic acid (GLDA) or and methylglycine N,N-diacetic acid (MGDA).

In exemplary embodiments, the hybrid dendrite copolymer compositions can also be used in fabric softener compositions as well as fabric care compositions. Suitable fabric softener formulations contain fabric softener actives, water, surfactants, electrolyte, phase stabilizing polymers, perfume, nonionic surfactant, non-aqueous solvent, silicones, fatty acid, dye, preservatives, optical brighteners, antifoam agents, and mixtures thereof. These fabric softener actives include, but are not limited, to diester quaternary ammonium compounds such as ditallowoyloxyethyl dimethyl ammonium chloride, dihydrogenated-tallowoyloxyethyl dimethyl ammonium chloride, dicanola-oyloxyethyl dimethyl ammonium chloride, ditallow dimethyl ammonium chloride, triethanolamine ester quats such as di-(hydrogenated tallowoyloxyethyl)-N,N-methylhydroxyethylammonium methylsulfate and di-(oleoyloxyethyl)-N,N-methylhydroxyethylammonium methylsulfate as well as others such as tritallow methyl ammonium chloride, methyl bis(tallow amidoethyl)-2-hydroxyethyl ammonium methyl sulfate, methyl bis(hydrogenated tallow amidoethyl)-2-hydroxyethyl ammonium methyl sulfate, methyl bis(oleyl amidoethyl)-2-hydroxyethyl ammonium methyl sulfate, ditallowoyloxyethyl dimethyl ammonium methyl sulfate, dihydrogenated-tallowoyloxyethyl dimethyl ammonium chloride, dicanola-oyloxyethyl dimethyl ammonium chloride, N-tallowoyloxyethyl-N-tallowoylaminopropyl methyl amine, 1,2-bis(hardened tallowoyloxy)-3-trimethylammonium propane chloride, dihardened tallow dimethyl ammonium chloride and mixtures thereof.

The preferred actives are diester quaternary ammonium (DEQA) compounds which are typically made by reacting alkanolamines such as MDEA (methyldiethanolamine) and TEA (triethanolamine) with fatty acids. Some materials that typically result from such reactions include N,N-di(acyloxyethyl)-N,N-dimethylammonium chloride or N,N-di(acyloxyethyl)-N,N-methylhydroxyethylammonium methylsulfate wherein the acyl group is derived from animal fats, unsaturated, and polyunsaturated, fatty acids, e.g., oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, and the like. Those skilled in the art will recognize that active softener materials made from such process can comprise a combination of mono-, di-, and tri-esters depending on the process and the starting materials.

As used herein, the term "fabric care formulations" include, but are not limited to, formulations used to treat fabric to improve fabric softness, shape retention, fabric elasticity, fabric tensile strength, fabric tear strength, fabric lubrication, fabric relaxation, durable press, wrinkle resistance, wrinkle reduction, ease of ironing, abrasion resistance, fabric smoothing, anti-felting, anti-pilling, crispness, appearance enhancement, appearance rejuvenation, color protection, color rejuvenation, anti-shrinkage, static reduction, water absorbency or repellency, stain repellency, refreshing, anti-microbial, odor resistance, and mixtures thereof. In addition to the non-anionic hybrid copolymers, the fabric care formulations may contain ingredients such as cationic surfactants, amphoteric surfactants, fabric softener actives, sucrose esters, softening agents, other fabric care agents, dispersing media, such as water, alcohols, diols; emulsifiers, perfumes, wetting agents, viscosity modifiers, pH buffers, antibacterial agents, antioxidants, radical scavengers, chelants, antifoaming agents, and mixtures thereof.

In further embodiments of the invention, the hybrid dendrite copolymer compositions can be used as flocculants and coagulants for sludge dewatering and water clarification in waste water treatment applications. Further, domestic and industrial sewage contains suspended matter which must be removed. The suspended particles are predominantly stabilized due to their net negative surface charge. The hybrid dendrite copolymer compositions disrupt this negative charge and enable removal of the suspended solids from the water. In still further embodiments, the hybrid dendrite copolymer compositions function as emulsion breakers for oil in water emulsions. These are useful in waste water treatment applications to comply with the limitations of fats oil and greases in the discharge water. In addition, the hybrid dendrite copolymer compositions function as reverse emulsion breakers in the oil field. In this application, small amounts of oil droplets are removed from the water continuous phase before the water can be safely returned to the environment. Additionally, hybrid dendrite copolymer compositions of the invention can be utilized in applications requiring film forming characteristics, such as in personal care and/or cosmetic applications.

The hybrid dendrite copolymer compositions can be used in cosmetic and personal care compositions. Cosmetic and personal care compositions include, for example, skin lotions and creams, skin gels, serums and liquids, facial and body cleansing products, wipes, liquid and bar soap, color cosmetic formulations, make-ups, foundations, sun care products, sunscreens, sunless tanning formulations, shampoos, conditioners, hair color formulations, hair relaxers, products with AHA and BHA and hair fixatives such as sprays, gels, mousses, pomades, and waxes, including low VOC hair fixatives and sunscreens. These cosmetic and personal care compositions may be in any form, including without limitation, emulsions, gels, liquids, sprays, solids, mousses, powders, wipes, or sticks.

The cosmetic and personal care compositions contain suitable "cosmetic and personal care actives". Suitable cosmetic and personal care active agents include, for example, sunscreen agents or actives, aesthetic enhancers, conditioning agents, anti-acne agents, antimicrobial agents, anti-inflammatory agents, analgesics, anti-erythemal agents, antipruritic agents, antiedemal agents, antipsoriatic agents, antifungal agents, skin protectants, vitamins, antioxidants, scavengers, antiirritants, antibacterial agents, antiviral agents, antiaging agents, protoprotection agents, hair growth enhancers, hair growth inhibitors, hair removal agents, antidandruff agents, anti-seborrheic agents, exfoliating agents, wound healing agents, anti-ectoparacitic agents, sebum modulators, immunomodulators, hormones, botanicals, moisturizers, astringents, cleansers, sensates, antibiotics, anesthetics, steroids, tissue healing substances, tissue regenerating substances, hydroxyalkyl urea, amino acids, peptides, minerals, ceramides, biohyaluronic acids, vitamins, skin lightening agents, self tanning agents, coenzyme Q10, niacinimide, capcasin, caffeine, and any combination of any of the foregoing.

Suitable sunscreen agents or actives useful in the present invention include any particulate sunscreen active that absorbs, scatters, or blocks ultraviolet (UV) radiation, such as UV-A and UV-B. Non-limiting examples of suitable particulate sunscreen agents include clays, agars, guars, nanoparticles, native and modified starches, modified cellulosics, zinc oxide, and titanium dioxide and any combination of the foregoing. Modified starches include, for example, DRY-FLO® PC lubricant (aluminum starch octenylsuccinate), DRY-FLO® AF lubricant (corn starch modified), DRY-FLO® ELITE LL lubricant (aluminum starch octenylsuccinate (and) lauryl lysine), DRY-FLO® ELITE BN lubricant (aluminum starch octenylsuccinate (and) boron nitride), all commercially available from National Starch and Chemical Company.

The sunscreen agents may include those that form a physical and/or chemical barrier between the UV radiation and the surface to which they are applied. Non-limiting examples of suitable sunscreen agents include ethylhexyl methoxycinnamate (octinoxate), ethylhexyl salicylate (octisalate), butylmethoxydibenzoylmethane, methoxydibenzoylmethane, avobenzone, benzophenone-3 (oxybenzone), octocrylene, aminobenzoic acid, cinoxate, dioxybenzone, homosalate, methyl anthranilate, octocrylene, octisalate, oxybenzone, padimate 0, phenylbenzimidazole sulfonic acid, sulisobenzone, trolamine salicylate and any combination of any of the foregoing The cosmetic and personal care compositions can optionally include one or more aesthetic enhancers (i.e., a material that imparts desirable tactile, visual, taste and/or olfactory properties to the surface to which the composition is applied) and can be either hydrophilic or hydrophobic. Non-limiting examples of commercial aesthetic enhancers together with their INCI names that are optionally suitable for use in the present invention include PURITY® 21C starch (zea maize (corn) starch) and TAPIOCA PURE (tapioca starch), as well as combinations thereof, that are available from the National Starch and Chemical Company.

Suitable conditioning agents include, but are not limited to, cyclomethicone; petrolatum; dimethicone; dimethiconol; silicone, such as cyclopentasiloxane and diisostearoyl trimethylolpropane siloxy silicate; sodium hyaluronate; isopropyl palmitate; soybean oil; linoleic acid; PPG-12/saturated methylene diphenyldiisocyanate copolymer; urea; amodimethicone; trideceth-12; cetrimonium chloride; diphenyl dimethicone; propylene glycol; glycerin; hydroxyalkyl urea; tocopherol; quaternary amines; and any combination thereof.

The cosmetic and personal care compositions can optionally include one or more adjuvants, such as pH adjusters, emollients, humectants, conditioning agents, moisturizers, chelating agents, propellants, rheology modifiers and emulsifiers such as gelling agents, colorants, fragrances, odor masking agents, UV stabilizer, preservatives, and any combination of any of the foregoing. Examples of pH adjusters include, but are not limited to, aminomethyl propanol, aminomethylpropane diol, triethanolamine, triethylamine, citric acid, sodium hydroxide, acetic acid, potassium hydroxide, lactic acid, and any combination thereof.

The cosmetic and personal care compositions may also contain preservatives. Suitable preservatives include, but are not limited to, chlorophenesin, sorbic acid, disodium ethylenedinitrilotetraacetate, phenoxyethanol, methylparaben, ethylparaben, propylparaben, phytic acid, imidazolidinyl urea, sodium dehydroacetate, benzyl alcohol, methylchloroisothiazolinone, methylisothiazolinone, and any combination thereof. In an embodiment of the invention, the cosmetic and personal care composition generally contains from about 0.001% to about 20% by weight of preservatives, based on 100% weight of total composition. In another embodiment, the composition contains from about 0.1% to about 10% by weight of preservatives, based on 100% weight of total composition.

The cosmetic and personal care compositions may optionally contain thickeners or gelling agents. Examples of such gelling agents include, but are not limited to, synthetic polymers such as the acrylic-based Carbopol® series of thickeners available from B.F. Goodrich, Cleveland, Ohio and associative thickeners such as Aculyn™, available from Rohm & Haas, Philadelphia, Pa. Other exemplary gelling agents include, cellulosic thickeners, such as derivatized hydroxyethyl cellulose and methyl cellulose, starch-based thickeners, such as acetylated starch, and naturally occurring gums, such as agar, algin, gum arabic, guar gum and xanthan gum. Thickeners and rheology modifiers may also include without limitation acrylates/steareth-20 itaconate copolymer, acrylates/ceteth-20 itaconate copolymer, potato starch modified, hydroxypropyl starch phosphate, acrylates/aminoacrylates/C10-30 alkyl PEG-20 itaconate copolymer, carbomer, acrylates/C10-30 alkyl acrylate crosspolymer, hydroxypropylcellulose, hydroxyethylcellulose, sodium carboxymethylcellulose, polyacrylamide (and) C13-14 isoparaffin (and) laureth-7, acrylamides copolymer (and) mineral oil (and) C13-14 isoparaffin (and) polysorbate 85, hydroxyethylacrylate/sodium acrylol dimethyltaurate copolymer, and hydroxyethylacrylate/sodium acrylol dimethyltaurate copolymer.

In an embodiment of the invention, the cosmetic and personal care composition is a hair cosmetic composition. Optional conventional additives may also be incorporated into the hair cosmetic compositions of this invention to provide certain modifying properties to the composition. Included among these additives are silicones and silicone derivatives; humectants; moisturizers; plasticizers, such as glycerine, glycol and phthalate esters and ethers; emollients, lubricants and penetrants, such as lanolin compounds; fragrances and perfumes; UV absorbers; dyes, pigments and other colorants; anticorrosion agents; antioxidants; detackifying agents; combing aids and conditioning agents; antistatic agents; neutralizers; glossifiers; preservatives; proteins, protein derivatives and amino acids; vitamins; emulsifiers; surfactants; viscosity modifiers, thickeners and rheology modifiers; gelling agents; opacifiers; stabilizers; sequestering agents; chelating agents; pearling agents; aesthetic enhancers; fatty acids, fatty alcohols and triglycerides; botanical extracts; film formers; and clarifying agents. These additives are present in small, effective amounts to accomplish their function, and generally will comprise from about 0.01 to about 10% by weight each, and from about 0.01 to about 20% by weight total, based on the weight of the composition.

The hair cosmetic composition may optionally be a mousse. For mousses, the solvent may be a lower ($C_{1-4}$) alcohol, particularly methanol, ethanol, propanol, isopropanol, or butanol, although any solvent known in the art may be used.

Optionally, an embodiment of the invention may also comprise a spray. For sprays propellants include any optional propellant(s). Such propellants include, without limitation, ethers, such as dimethyl ether; one or more lower boiling hydrocarbons such as $C_3$-$C_6$ straight and branched chain hydrocarbons, for example, propane, butane, and isobutane; halogenated hydrocarbons, such as, hydrofluorocarbons, for example, 1,1-difluoroethane and 1,1,1,2-tetrafluoroethane, present as a liquefied gas; and the compressed gases, for example, nitrogen, air and carbon dioxide.

In yet another aspect, the invention relates to a method of preparing a hybrid dendrite copolymer composition. The method of preparing the hybrid dendrite copolymer composition comprises reacting at least one first monomer with a solution of a naturally derived hydroxyl containing chain transfer agent that includes only minor amounts of secondary chain transfer agents, such as sodium hypophosphite. Then, upon completion of the polymerization of the first monomer, the second monomer is added and this second monomer is polymerized in the presence of the same naturally derived hydroxyl containing chain transfer agent.

The process to produce the hybrid dendrite copolymer compositions requires that the monomers be added sequentially to the reaction. The naturally derived hydroxyl containing chain transfer agent may be added to the reaction along with the first monomer or may be added to the initial charge. Depending on the application, the relative order of the monomers may be important. For example, if two monomers A and B are used, it may be better to add monomer A before monomer B to the reaction mixture. This is exemplified by Examples 1 and 2 and the performance of these samples in Example 3. The polymer synthesized with the AMPS added before the acrylic acid (Example 1) has better anti-redeposition properties compared to the polymer synthesized where the acrylic acid is added before the AMPS. Therefore, the order of addition of the monomers will depend upon the desired. Additionally, it is within the scope of the invention to add monomer A and then add monomer B and switch back to monomer A and so on. Also, the monomer addition may determine if the product is a solution or a gel. In most cases, the solution is preferred and this will determine the right sequence of monomer addition.

One skilled in the art will recognize that the composition and the properties of the hybrid dendrite copolymers can be controlled by the sequence of the monomer feed, the relative ratio of the two or more monomers and the initiator to monomer concentration during each feed. This will control the number of synthetic chains and the length of these synthetic chains attached to the naturally derived hydroxyl containing chain transfer agent. The higher the ratio of initiator to monomer the shorter the attached synthetic chains are. Also, the higher the ratio of initiator to monomer the greater number of the synthetic chains formed. Hence, depending on the application, one may want longer synthetic chains of one of the monomers and shorter synthetic chains of the other monomer attached to the naturally derived hydroxyl containing chain transfer agent. This can be controlled by adjusting the monomer to initiator concentration during the polymerization of each of the monomers. This also changes the number of synthetic chains of each monomer attached to the naturally derived hydroxyl containing chain transfer agent.

In an embodiment of the invention, the secondary chain transfer agent may be less than 25 weight percent of the hybrid dendrite copolymer composition, preferably less than 10 weight percent of the hybrid dendrite copolymer composition, and most preferably less than 1 weight percent of the hybrid dendrite copolymer composition. The method may further comprise catalyzing the polymerizing step with an initiator that is substantially free of a metal ion initiating system at a temperature sufficient to activate said initiator.

In still yet another aspect, the invention relates to a blend of a hybrid dendrite copolymer composition and a builder or a chelating agent. Exemplary chelating agents suitable for use in the present invention include, but are not limited to, alkali metal or alkali-metal earth carbonates, alkali metal or alkali earth citrates, alkali metal or alkali earth silicates, glutamic acid N,N-diacetic acid (GLDA), methylglycine N,N-diacetic acid (MGDA) and combinations thereof. In an embodiment according to the invention, the blend may be a particulate containing a uniform dispersion of the hybrid copolymer and the builder or chelating agent. The particulate may also be a powder or a granule.

In still yet another aspect, the invention relates to a hybrid dendrite copolymer composition containing both anionic and cationic groups, thus rendering the hybrid dendrite copolymer composition amphoteric. The anionic moieties can be on the naturally derived hydroxyl containing chain transfer agent with the cationic moieties on the synthetic component or the cationic moieties can be on the naturally derived hydroxyl containing chain transfer agent with the anionic moieties on the synthetic component or combinations thereof. When the natural component is a polysaccharide, the anionic material can be an oxidized starch and the cationic moiety can be derived from cationic ethylenically unsaturated monomers such as diallyldimethylammonium chloride. Alternatively, the oxidized starch itself may first be reacted with cationic substituent such as 3-chloro-2-hydroxypropyl) trimethylammonium chloride and then reacted with a synthetic anionic or cationic monomer or mixtures thereof. In another embodiment, a cationic starch may be reacted with an anionic monomer. Finally, the cationic and anionic moieties may be on the synthetic component of these polymers in which case one monomer would be anionic and the other monomer would be cationic. These amphoteric hybrid dendrite copolymer compositions are particularly useful in hard surface cleaning applications. It is understood that these polymers will contain both a natural component and a synthetic component. The cationic moieties are preferably present in the range of 0.001 to 40 mole % of the anionic moieties, more preferably the cationic moieties are present in the range of 0.01 to 20 mole % of the anionic moieties, and most preferably the cationic moieties are present in the range of 0.1 to 10 mole % of the anionic moieties.

EXAMPLES

The following examples are intended to exemplify the present invention but are not intended to limit the scope of the invention in any way. The breadth and scope of the invention are to be limited solely by the claims appended hereto.

Comparative Example 1

Example of a traditional graft copolymer using a mixture of acrylic acid and sodium 2-acrylamido-2-methyl propane sulfonate (AMPS):

A reactor containing 156 grams of water and 49 grams of maltodextrin (Cargill MD™ 01918 maltodextrin) (DE 18) and 0.0039 grams of Ferrous ammonium sulfate hexahydrate (FAS) was heated to 98° C. A mixed solution containing 81.6 grams of acrylic acid and 129.2 of a 50% solution of sodium 2-acrylamido-2-methyl propane sulfonate (AMPS) was added to the reactor over a period of 45 minutes. An initiator solution comprising 13 grams of 35% hydrogen peroxide solution in 78 grams of deionized water was simultaneously added to the reactor over a period of 60 minutes. The reaction product was held at 98° C. for an additional hour. The polymer was then neutralized by adding 27.2 grams of a 50% solution of NaOH. The final product was a clear yellow solution.

Example 1

Example of using anionic monomers to produce hybrid dendrite copolymer compositions. AMPS as the first monomer (e.g., $SM_1$) and acrylic acid as the second monomer (e.g., $SM_2$).

A reactor containing 100 grams of water and 38 grams of maltodextrin (Cargill MD™ 01918 maltodextrin) (DE 18) was heated to 98° C. 99.5 grams of a 50% solution of sodium 2-acrylamido-2-methyl propane sulfonate (AMPS) was added to the reactor over a period of 30 minutes. An initiator solution of 5 grams of sodium persulfate in 40 grams of deionized water was simultaneously added to the reactor over a period of 30 minutes. The reaction product was held at 98° C. for 15 minutes. 62.5 grams of acrylic acid was added to the reactor over a period of 30 minutes. An initiator solution of 5 grams of sodium persulfate in 40 grams of deionized water was simultaneously added to the reactor over a period of 30 minutes. The reaction product was held at 98° C. for an additional hour. The polymer was then neutralized by adding 6 grams of a 50% solution of NaOH. The final product was a clear amber solution. The weight average molecular weight was 31,995 and the number average molecular weight of this polymer was 5,484.

Example 2

Example of using anionic monomers to produce hybrid dendrite copolymer compositions. Acrylic acid as the first monomer, AMPS as the second monomer.

A reactor containing 100 grams of water and 38 grams of maltodextrin (Cargill MD™ 01918 maltodextrin) (DE 18) was heated to 98° C. 62.5 grams of acrylic acid was added to the reactor over a period of 30 minutes. An initiator solution of 5 grams of sodium persulfate in 40 grams of deionized water was simultaneously added to the reactor over a period of 30 minutes. The reaction product was held at 98° C. for 15 minutes. 99.5 grams of a 50% solution of sodium 2-acrylamido-2-methyl propane sulfonate (AMPS) was added to the reactor over a period of 30 minutes. An initiator solution of 5 grams of sodium persulfate in 40 grams of deionized water was simultaneously added to the reactor over a period of 30 minutes. The reaction product was held at 98° C. for an additional hour. The polymer was then neutralized by adding 6 grams of a 50% solution of NaOH. The final product was a dark amber solution. The weight average molecular weight was 41,757 and the number average molecular weight of this polymer was 5,800.

Example 3

One wash anti-redeposition data using commercial Sun liquid detergent. The test was conducted in a full scale washing machine using 3 cotton and 3 polyester/cotton swatches. The soil used was 17.5 g rose clay, 17.5 g bandy black clay and 6.9 g oil blend (75:25 vegetable/mineral). The test was conducted for 3 cycles using 100 g powder detergent per wash load. The polymers were dosed in at 1.0 weight % of the detergent. The wash conditions used a temperature of 33.9° C. (93° F.), 150 ppm hardness and a 10 minute wash cycle.

L (luminance) a (color component) b (color component) values before the first cycle and after the third cycle was measured as $L_1$, $a_1$, $b_1$ and $L_2$, $a_2$, $b_2$, respectively, using a spectrophotometer. Delta whiteness index is calculated using the L, a, b values above.

Lower Delta WI (whiteness index) numbers are better. The data indicate the polymers with the hybrid dendrite copolymer compositions (Example 1 and 2) perform better than the normal graft copolymer (Comparative Example 1) though they have the same overall composition. Furthermore, these polymers perform better than the sodium polyacrylate (Alcosperse 602N) which is the industry standard for this application. Also, the polymer of Example 1 performs slightly better than that of example 2 in which the order that the monomers were reacted were reversed. All of this clearly indicates that the hybrid dendrite copolymer composition is different from a traditional graft copolymer. Moreover, the composition and the properties of the molecules can be controlled by the sequence of the monomer feed, the relative ratio of the 2 monomers and the initiator to monomer concentration during each feed. This will control the number of synthetic chains of each monomer and the length of these chains attached to the naturally derived hydroxyl containing chain transfer agent which in this case is maltodextrin.

Example 4

Example of using anionic monomers to produce hybrid dendrite copolymer compositions attached to a saccharide moiety. AMPS as the first monomer and acrylic acid as the second monomer.

A reactor containing 80 grams of water and 58 grams of an 80% solution of Cargill Sweet Satin Maltose was heated to 98° C. 99.5 grams of a 50% solution of sodium 2-acrylamido-2-methyl propane sulfonate (AMPS) was added to the reactor over a period of 30 minutes. An initiator solution of 5 grams of sodium persulfate in 40 grams of deionized water was simultaneously added to the reactor over a period of 30 minutes. The reaction product was held at 98° C. for 15 minutes. 62.5 grams of acrylic acid was added to the reactor over a period of 30 minutes. An initiator solution of 5 grams of sodium persulfate in 40 grams of deionized water was simultaneously added to the reactor over a period of 30 minutes. The reaction product was held at 98° C. for an additional hour. The polymer was then neutralized by adding 6 grams of a 50% solution of NaOH. The final product was a dark amber solution. The weight average molecular weight was 25,558 and the number average molecular weight of this polymer was 6,342.

Example 5

Example of a using an anionic and a hydrophobic monomer to produce hybrid dendrite copolymers by grafting on to a polysaccharide moiety. Copolymer of acrylic acid and methylmethacrylate with acrylic acid as the first monomer and methylmethacrylate as the second monomer.

A reactor containing 100 grams of water and 38 grams of Cargill MD 01918 (DE 18) was heated to 98° C. 62.5 grams of acrylic acid was added to the reactor over a period of 30 minutes. An initiator solution of 5 grams of a sodium persulfate in 40 grams of deionized water was simultaneously added to the reactor over a period of 30 minutes. The reaction product was held at 98° C. for 15 minutes. 24 grams of methylmethacrylate was added to the reactor over a

TABLE 2

| Sample | Description | Delta WICIE (Whiteness Index) | | | | |
| --- | --- | --- | --- | --- | --- | --- |
| | | Cotton Plain weave | Poly/cotton Plain weave | Polyester Double knit | Cotton Interlock | Nylon woven |
| Control (no polymer) | | 6.61 | 5.12 | 11.31 | 12.89 | 3.47 |
| Alcosperse 602N Na polyacrylate | Synthetic copolymer, no natural piece | 4.05 | 3.53 | 5.71 | 8.31 | 1.62 |
| Alcosperse 602N Na polyacrylate repeat | | 3.75 | 3.20 | 3.56 | 8.84 | 1.11 |
| Example 1 | AMPS before AA feed | 1.55 | 1.83 | 2.65 | 5.45 | 1.03 |
| Example 2 | AA feed before AMPS | 1.66 | 2.24 | 2.90 | 6.48 | 1.41 |
| Comparative Example 1 | AMPS-AA mixed feed | 4.45 | 4.05 | 7.30 | 10.31 | 2.62 | period of 30 minutes. An initiator solution of 5 grams of a sodium persulfate in 40 grams of deionized water was simultaneously added to the reactor over a period of 30 minutes. The reaction product was held at 98° C. for an additional hour. The polymer was then neutralized by adding 31 grams of a 50% solution of NaOH. The final product was a thick opaque yellow solution.

Example 6

Example of using anionic monomers to produce hybrid dendrite copolymer compositions. AMPS as the first monomer and acrylic acid as the second monomer.

A reactor containing 90 grams of water and 40 grams of maltodextrin (StarDri 180) (DE 18) was heated to 90° C. 62.5 grams of acrylic acid was added to the reactor over a period of 35 minutes. An initiator solution of 8.3 grams of sodium persulfate (4 mole % of acrylic acid) in 45 grams of deionized water was simultaneously added to the reactor over a period of 30 minutes. The reaction product was held at 90° C. for 15 minutes. 99.0 grams of a 50% solution of sodium 2-acrylamido-2-methyl propane sulfonate (AMPS) was added to the reactor over a period of 35 minutes. An initiator solution of 2 grams of sodium persulfate (4 mole % of AMPS) in 40 grams of deionized water was simultaneously added to the reactor over a period of 45 minutes. The reaction product was held at 90° C. for an additional hour. The polymer was then neutralized by adding 54 grams of a 50% solution of NaOH. The final product was a dark amber solution with 41% solids.

Example 7

Example of using anionic monomers to produce hybrid dendrite copolymer compositions. acrylic acid as the first monomer and AMPS as the second monomer.

A reactor containing 75 grams of water and 40.2 grams of maltodextrin (StarDri 180) (DE 18) was heated to 95° C. 54.5 grams of acrylic acid was added to the reactor over a period of 30 minutes. An initiator solution of 5.8 grams of sodium persulfate (3.2 mole % of acrylic acid) in 40 grams of deionized water was simultaneously added to the reactor over a period of 35 minutes. The reaction product was held at 95° C. for 20 minutes. 148.7 grams of a 50% solution of sodium 2-acrylamido-2-methyl propane sulfonate (AMPS) was added to the reactor over a period of 30 minutes. An initiator solution of 3.8 grams of sodium persulfate (4.9 mole % of AMPS) in 40 grams of deionized water was simultaneously added to the reactor over a period of 35 minutes. The reaction product was held at 95° C. for an additional hour. The polymer was then neutralized by adding 50 grams of a 50% solution of NaOH. The final product was a dark amber solution with 41% solids and pH 6.0.

Example 8

Example of using anionic monomers to produce hybrid dendrite copolymer compositions.

A reactor containing 263 grams of water and 140.2 grams of maltodextrin (StarDri 180) (DE 18) was heated to 95° C. 204.5 grams of acrylic acid was added to the reactor over a period of 60 minutes. An initiator solution of 32.6 grams of sodium persulfate in 211 grams of deionized water was simultaneously added to the reactor over a period of 70 minutes. The reaction product was held at 95° C. for 20 minutes. 432.9 grams of a 50% solution of sodium 2-acrylamido-2-methyl propane sulfonate (AMPS) was added to the reactor over a period of 60 minutes. An initiator solution of 11 grams of sodium persulfate in 71.3 grams of deionized water was simultaneously added to the reactor over a period of 70 minutes. The reaction product was held at 95° C. for an additional hour. The polymer was then neutralized by adding 204.4 grams of a 50% solution of NaOH. The final product was a dark amber solution with 43% solids.

Example 9

Example of using anionic monomers to produce hybrid dendrite copolymer compositions. A reactor containing 75 grams of water and 40 grams of maltodextrin (StarDri 100) (DE 10) was heated to 95° C. A 148.7 grams of a 50% solution of sodium 2-acrylamido-2-methyl propane sulfonate (AMPS) was added to the reactor over a period of 30 minutes. An initiator solution of 3.8 grams of sodium persulfate in 40 grams of deionized water was simultaneously added to the reactor over a period of 35 minutes. The reaction product was held at 95° C. for 20 minutes. 54.5 grams of acrylic acid was added to the reactor over a period of 30 minutes. An initiator solution of 5.8 grams of sodium persulfate in 40 grams of deionized water was simultaneously added to the reactor over a period of 35 minutes. The reaction product was held at 95° C. for an additional hour. The polymer was then neutralized by adding 54 grams of a 50% solution of NaOH. The final product was a clear amber solution of 41% solids.

Example 10

Example of using anionic monomers to produce hybrid dendrite copolymer compositions.

A reactor containing 75.8 grams of water and 40 grams of maltodextrin (StarDri 100) (DE 10) was heated to 95° C. 123.8 grams of a 50% solution of sodium 2-acrylamido-2-methyl propane sulfonate (AMPS) was added to the reactor over a period of 30 minutes. An initiator solution of 3.1 grams of sodium persulfate (4.9 mole % of AMPS) in 40 grams of deionized water was simultaneously added to the reactor over a period of 35 minutes. The reaction product was held at 95° C. for 20 minutes. 58.5 grams of acrylic acid was added to the reactor over a period of 30 minutes. An initiator solution of 6.2 grams of sodium persulfate (3.2 mole % of acrylic acid) in 40 grams of deionized water was simultaneously added to the reactor over a period of 35 minutes. The reaction product was held at 95° C. for an additional hour. The polymer was then neutralized by adding 58.5 grams of a 50% solution of NaOH. The final product was a clear amber solution of 41% solids.

Example 11

Example of using anionic monomers to produce hybrid dendrite copolymer compositions.

A reactor containing 185 grams of water and 127 grams of maltodextrin (StarDri 180) (DE 18) was heated to 85° C. 85.6 grams of acrylic acid was added to the reactor over a period of 60 minutes. An initiator solution of 13.6 grams of sodium persulfate in 90 grams of deionized water was prepared. 67% of this initiator solution was simultaneously added to the reactor over a period of 70 minutes. The reaction product was held at 85° C. for 20 minutes. 179 grams of a 50% solution of sodium 2-acrylamido-2-methyl propane sulfonate (AMPS) was added to the reactor over a period of 60 minutes. The remaining 33% of the initiator was added over a period of 70 minutes. The reaction product was held at 85° C. for an additional hour. The polymer was then neutralized by adding 85.6 grams of a 50% solution of NaOH. The final product was a dark amber solution with 40.5% solids.

Example 12

Example of using anionic monomers to produce hybrid dendrite copolymer compositions.

A reactor containing 185 grams of water and 109 grams of maltodextrin (StarDri 180) (DE 18) was heated to 85° C. 109 grams of acrylic acid was added to the reactor over a period of 60 minutes. An initiator solution of 16 grams of sodium persulfate in 90 grams of deionized water was prepared. 72% of this initiator solution was simultaneously added to the reactor over a period of 70 minutes. The reaction product was held at 85° C. for 20 minutes. 175 grams of a 50% solution of sodium 2-acrylamido-2-methyl propane sulfonate (AMPS) was added to the reactor over a period of 60 minutes. The remaining 28% of the initiator was added over a period of 70 minutes. The reaction product was held at 85° C. for an additional hour. The polymer was then neutralized by adding 109.2 grams of a 50% solution of NaOH. The final product was a dark amber solution with 43.5% solids.

Example 13—Water Treatment Compositions

Once prepared, hybrid dendrite copolymer compositions are incorporated into a water treatment composition that includes other water treatment chemicals. Other water treatment chemicals include corrosion inhibitors such as orthophosphates, zinc compounds and tolyl triazole. The level of inventive polymer utilized in water treatment compositions is determined by the treatment level desired for the particular aqueous system treated. Hybrid dendrite copolymer compositions generally comprise from 10 to 25 percent by weight of the water treatment composition. Conventional water treatment compositions are known to those skilled in the art, and exemplary water treatment compositions are set forth in the four formulations below. These compositions containing the polymer of the present invention have application in, for example, the oil field.

| Formulation 1 | Formulation 2 |
|---|---|
| 11.3% of Polymer of Ex. 2 | 11.3% Polymer of Ex. 3 |
| 47.7% Water | 59.6% Water |
| 4.2% HEDP | 4.2% HEDP |
| 10.3% NaOH | 18.4% TKPP |
| 24.5% Sodium Molybdate | 7.2% NaOH |
| 2.0% Tolyl triazole | 2.0% Tolyl triazole |
| pH 13.0 | pH 12.64 |

| Formulation 3 | Formulation 4 |
|---|---|
| 22.6% of Polymer of Ex. 2 | 11.3% Polymer of Ex. 5 |
| 51.1% Water | 59.0% Water |
| 8.3% HEDP | 4.2% HEDP |
| 14.0% NaOH | 19.3% NaOH |
| 4.0% Tolyl triazole | 2.0% Tolyl triazole |
| pH 12.5 | 4.2% ZnCl$_2$ |
|  | pH 13.2 | where HEDP is 1-hydroxyethylidene-1,1 diphosphonic acid and TKPP is tri-potassium polyphosphate.

Examples 14 to 16—Granular Powder Laundry Detergent Formulations

TABLE 3

| Powdered Detergent Formulations | | | |
|---|---|---|---|
| Ingredient | Example 14 Wt % | Example 15 Wt % | Example 16 Wt % |
| Anionic surfactant | 22 | 20 | 10.6 |
| Non-ionic surfactant | 1.5 | 1.1 | 9.4 |
| Cationic surfactant | — | 0.7 | — |
| Zeolite | 28 | — | 24 |
| Phosphate | — | 25 | — |
| Silicate | | | 8.5 |
| Sodium carbonate/bicarbonate | 27 | 14 | 9 |
| Sulfate | 5.4 | 15 | 11 |
| Sodium silicate | 0.6 | 10 | — |
| Polyamine | 4.3 | 1.9 | 5 |
| Brighteners | 0.2 | 0.2 | — |
| Sodium perborate | | 1 | |
| Sodium percarbonate | 1 | — | — |
| Sodium hypochlorite | | | 1 |
| Suds suppressor | 0.5 | 0.5 | — |
| Bleach catalyst | 0.5 | — | |
| Polymer of Example 2 | 1 | | |
| Polymer of Example 3 | | 5 | |
| Polymer of Example 5 | | | 2 |
| Water and others | Balance | Balance | Balance |

Example 17—Hard Surface Cleaning Formulations

| Ingredient | wt % |
|---|---|
| Acid Cleaner | |
| Citric acid (50% solution) | 12.0 |
| Phosphoric acid | 1.0 |
| C$_{12}$-C$_{15}$ linear alcohol ethoxylate with 3 moles of EO | 5.0 |
| Alkyl benzene sulfonic acid | 3.0 |
| Polymer of Example 2 | 1.0 |
| Water | 78.0 |
| Alkaline Cleaner | |
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of Example 2 | 1.0 |

Example 18—Automatic Dishwash Powder Formulation

| Ingredients | wt % |
|---|---|
| Sodium tripolyphosphate | 25.0 |
| Sodium carbonate | 25.0 |
| C12-15 linear alcohol ethoxylate with 7 moles of EO | 3.0 |
| Polymer of Example 2 | 4.0 |
| Sodium sulfate | 43.0 |

Example 19—Automatic Non-Phosphate Dishwash Powder Formulation

| Ingredients | wt % |
| --- | --- |
| Sodium citrate | 30 |
| Polymer of Example 3 | 10 |
| Sodium disilicate | 10 |
| Perborate monohydrate | 6 |
| Tetra-acetyl ethylene diamine | 2 |
| Enzymes | 2 |
| Sodium sulfate | 30 |

Example 20—Handwash Fabric Detergent

| Ingredients | wt % |
| --- | --- |
| Linear alkyl benzene sulfonate | 15-30 |
| Nonionic surfactant | 0-3 |
| Na tripolyphosphate (STPP) | 3-20 |
| Na silicate | 5-10 |
| Na sulfate | 20-50 |
| Bentonite clay/calcite | 0-15 |
| Polymer of Example 5 | 1-10 |
| Water | Balance |

Example 21—Fabric Detergent with Softener

| Ingredients | wt % |
| --- | --- |
| Linear alkylbenzene sulfonate | 2 |
| Alcohol ethoxylate | 4 |
| STPP | 23 |
| Polymer of Example 2 | 1 |
| Na carbonate | 5 |
| Perborate tetrahydrate | 12 |
| Montmorillonite clay | 16 |
| Na sulfate | 20 |
| Perfume, FWA, enzymes, water | Balance |

Example 22—Bar/Paste for Laundering

| Ingredients | wt % |
| --- | --- |
| Linear alkylbenzene sulfonate | 15-30 |
| Na silicate | 2-5 |
| STPP | 2-10 |
| Polymer of Example 3 | 2-10 |
| Na carbonate | 5-10 |
| Calcite | 0-20 |
| Urea | 0-2 |
| Glycerol | 0-2 |
| Kaolin | 0-15 |
| Na sulfate | 5-20 |
| Perfume, FWA, enzymes, water | Balance |

Example 23—Liquid Detergent Formulation

| Ingredients | wt % |
| --- | --- |
| Linear alkyl benzene sulfonate | 10 |
| Alkyl sulfate | 4 |
| Alcohol ($C_{12}$-$C_{15}$) ethoxylate | 12 |
| Fatty acid | 10 |
| Oleic acid | 4 |
| Citric acid | 1 |
| NaOH | 3.4 |
| Propanediol | 1.5 |
| Ethanol | 5 |
| Polymer of Example 5 | 1 |
| Ethanol oxidase | 5 u/ml |
| Water, perfume, minors | up to 100 |

Example 24

Personal Care Formulation—Water Repellant Sunscreen

| Ingredients | wt % |
| --- | --- |
| Glycerin | 5.0 |
| Polymer of Example 5 | 2.0 |
| PEG 100 stearate | 5.0 |
| Isostearyl stearate | 4.0 |
| Octyl methoxycinnamate | 7.5 |
| Butyl methoxydibenzoylmethane | 1.5 |
| Hexyl methicone | 5.0 |
| DI water | 70.0 |

Example 25

Example of a copolymer with hybrid dendrite copolymers using a cationic and a non-ionic monomer. Copolymer of diallydimethylammonium chloride (DADMAC) as the first monomer and N,N dimethylacrylamide as the second monomer.

A reactor containing 300 grams of water, 15 grams of 62% solution of diallydimethylammonium chloride (DADMAC) and 100 grams of Star Dri 5 (DE 5, waxy maize maltodextrin) is heated to 85° C. is An initiator solution of 0.4 grams of ammonium persulfate in 20 grams of deionized water is simultaneously added to the reactor over a period of 30 minutes. The reaction product is held at 85° C. for 15 minutes. 10 grams of N,N dimethylacrylamide is added to the reactor over a period of 30 minutes. An initiator solution of 0.4 grams of ammonium persulfate in 20 grams of deionized water was simultaneously added to the reactor over a period of 30 minutes. The reaction product is held at 85° C. for an additional hour.

Example 26

Example of a hybrid dendrite copolymer composition using an anionic and non-ionic monomer. Copolymer of acrylic acid and N,N dimethylacrylamide with N,N dimethylacrylamide as the first monomer and acrylic acid as the second monomer.

A reactor containing 120 grams of water and 115.7 grams of Star Dri 180 (95% DE 18 powdered dent maltodextrin from Tate and Lyle) was heated to 85° C. 20 grams of N,N dimethylacrylamide (0.2 moles) was added to the reactor over a period of 30 minutes. An initiator solution of 0.95 grams of sodium persulfate (2 mole % of monomer) in 40 grams of deionized water was simultaneously added to the reactor over a period of 30 minutes. The reaction product was held at 85° C. for 30 minutes. 80 grams of acrylic acid (1.11 moles) was added to the reactor over a period of 30 minutes. An initiator solution of 5.3 grams of a sodium persulfate (2 mole % of monomer) in 40 grams of deionized water was simultaneously added to the reactor over a period of 30 minutes. There was a visible increase in viscosity of the reaction product during this phase of the reaction. The reaction product was held at 85° C. for an additional hour. The reaction product was cooled and was partially neutralized using 40 grams of 50% NaOH solution. The final product was a very viscous amber solution with a solids content of 47.5%.

Example 27

Example of a hybrid dendrite copolymer composition using an anionic and an amine monomer. Copolymer of acrylic acid and dimethylaminoethyl methacrylate with acrylic acid as the first monomer and dimethylaminoethyl methacrylate as the second monomer.

A reactor containing 100 grams of water and 38 grams of Star Dri 180 (95% DE 18 powdered dent maltodextrin from Tate and Lyle) was heated to 85° C. 62.5 grams of acrylic acid was added to the reactor over a period of 30 minutes. An initiator solution of 6.2 grams of sodium persulfate in 120 grams of deionized water was simultaneously added to the reactor over a period of 15 minutes. The reaction product was held at 85° C. for 30 minutes during which the color changed from water white to light yellow. 37.7 grams of dimethylaminoethyl methacrylate was added to the reactor over a period of 30 minutes and the product turned opaque yellow. An initiator solution of 1.7 grams of sodium persulfate in 120 grams of deionized water was simultaneously added to the reactor over a period of 30 minutes. The reaction product was held at 85° C. for an additional hour. The final product was opaque milky white homogenous polymer solution with 30% solids.

Example 28

Example of a hybrid dendrite copolymer composition using two non-ionic monomers. Copolymer of acrylamide and hydroxypropyl methacrylate.

A reactor containing 300 grams of water and 60 grams of Star Dri 10 (95% DE 10 powdered waxy maltodextrin from Tate and Lyle) was heated to 85° C. 129 grams of hydroxypropyl methacrylate was added to the reactor over a period of 30 minutes. An initiator solution of 4.2 grams of sodium persulfate in 40 grams of deionized water was simultaneously added to the reactor over a period of 30 minutes. The reaction solution turned opaque milky white during this addition. The reaction product was held at 85° C. for 30 minutes. 34 grams of a 50% solution of acrylamide was added to the reactor over a period of 30 minutes. An initiator solution of 2.2 grams of sodium persulfate in 140 grams of deionized water was simultaneously added to the reactor over a period of 30 minutes. The reaction product was held at 85° C. for an additional hour. The final polymer solution was opaque milky white in color 29.7% solids.

Example 29

Example of a hybrid dendrite copolymer composition using an anionic and cationic monomer. Copolymer of acrylic acid and dimethylaminoethyl methacrylate methyl chloride quat with acrylic acid arms as first monomer and dimethylaminoethyl methacrylate methyl chloride quaternary as the second monomer.

A reactor containing 200 grams of water and 158 grams of Star Dri 10 (95% DE 10 powdered waxy maltodextrin from Tate and Lyle) was heated to 85° C. 50 grams of acrylic acid (0.69 moles) was added to the reactor over a period of 30 minutes. An initiator solution of 6.6 grams of a sodium persulfate (4 mole % of monomer) in 150 grams of water was simultaneously added to the reactor over a period of 30 minutes. The reaction product was held at 85° C. for 30 minutes. 18 grams of an 80% aqueous solution of dimethylaminoethyl methacrylate methyl chloride quaternary (0.069 moles) dissolved in 150 grams of water was added to the reactor over a period of 30 minutes. The cationic monomer was 10 mole % of the anionic monomer. An initiator solution of 0.66 grams of sodium persulfate (4 mole % of monomer) in 40 grams of water was simultaneously added to the reactor over a period of 30 minutes. The reaction product was held at 85° C. for an additional hour. The final product was a clear yellow solution with a solids content of 28.3%.

Comparative Example 2

Example of a traditional hybrid copolymer using a mixture of acrylic acid and sodium 2-acrylamido-2-methyl propane sulfonate (AMPS):

A reactor containing 156 grams of water and 49 grams of maltodextrin (Cargill MD™ 01918 maltodextrin) (DE 18) was heated to 98° C. A mixed solution containing 81.6 grams of acrylic acid and 129.2 of a 50% solution of sodium 2-acrylamido-2-methyl propane sulfonate (AMPS) was added to the reactor over a period of 45 minutes. An initiator solution comprising 6.45 grams of sodium persulfate in 91 grams of deionized water was simultaneously added to the reactor over a period of 60 minutes. The reaction product was held at 98° C. for an additional hour. The polymer was then neutralized by adding 27.2 grams of a 50% solution of NaOH. The final product was a clear yellow solution with 38.7% solids.

Example 30

The performance of the hybrid dendrite polymers of this invention of Example 1 and 2 were compared to the hybrid copolymers of Comparative Example 2. The performance of these 3 polymers were measured for calcium carbonate inhibition using a procedure outlined in Example 8 of U.S. Pat. No. 5,547,612.

TABLE 4

| Example | Process Description 1$^{st}$ feed, 2$^{nd}$ feed | % calcium carbonate inhibition at Polymer Dosage (ppm) | | |
|---|---|---|---|---|
| | | 10 | 15 | 25 |
| Example 1 | AMPS, AA | 53 | 71 | 100 |
| Example 2 | AA, AMPS | 70 | 82 | 100 |
| Comparative Example 2 | AA-AMPS mixed | 39 | 40 | 48 |

In this test the higher the carbonate inhibition the better the performance of these polymers. These data indicate that performance of the hybrid dendrite copolymers of this invention are superior to that of the hybrid copolymers of the prior art. The polymers of this invention outperform the prior art polymers at all 3 dosage levels.

Example 31—Hard Surface Cleaning Formulation

| Ingredient | wt % |
|---|---|
| Berol DGR 81 (nonionic surfactant/alkyl glucoside blend) | 1.0 |
| Na4EDTA (40% solution) | 1.0 |
| Polymer of Example 28 | 0.2 |
| Deionized Water to | 100.0 |

Example 32

Example of a hybrid dendrite copolymer composition using acrylic acid and diallyldimethylammonium chloride.

A reactor containing 200 grams of water and 158 grams of Star DRI 10 (95% DE 10 powdered waxy maltodextrin from Tate and Lyle) was heated to 85° C. 50 grams of acrylic acid was added to the reactor over a period of 30 minutes. An initiator solution of 6.6 grams of sodium persulfate in 150 grams of water was simultaneously added to the reactor over a period of 30 minutes. The solution changed into faint yellow color after initial addition of acrylic acid. The reaction product was held at 85° C. for 30 minutes and was then yellow in color. The unreacted acrylic acid was 638 ppm which means that 0.72% of the acrylic acid monomer was unreacted. 17.2 grams of diallyldimethylammonium chloride (65% solution in water) mixed with 150 grams of water were added to the reactor over a period of 30 minutes. An initiator solution of 0.66 grams of sodium persulfate in 40 grams of water was simultaneously added to the reactor over a period of 30 minutes. The reaction product was held at 85° C. for an additional hour. The final product was a light yellow color clear polymer solution with a solids content of 28%.

Example 33

Example of a hybrid dendrite copolymer composition using diallyldimethylammonium chloride and itaconic acid:

A reactor containing 200 grams of water and 158 grams of Star DRI 10 (95% DE 10 powdered waxy maltodextrin from Tate and Lyle) was heated to 85° C. The solution was light milky color. 17.2 grams of diallyldimethylammonium chloride (65% aqueous solution) mixed with 150 grams of water was added to the reactor over a period of 30 minutes. An initiator solution of 0.66 grams of sodium persulfate in 40 grams of water was simultaneously added to the reactor over a period of 30 minutes. The solution changed into faint yellow color after initial addition of diallyldimethylammonium chloride. The reaction product was held at 85° C. for 30 minutes. 25 grams of itaconic acid neutralized with 15.4 grams of 50% sodium hydroxide and dissolved in 40 grams of water was added to the reactor over a period of 30 minutes. An initiator solution of 6.6 grams of sodium persulfate in 150 grams of deionized water was simultaneously added to the reactor over a period of 30 minutes. The solution turned into tan color upon addition of itaconic acid solution. The reaction product was held at 85° C. for an additional hour. The final product was clear amber solution with the solids content of 25%.

Example 34

Example of a hybrid dendrite copolymer composition using acrylic acid and sodium 2-acrylamido-2-methyl propane sulfonate (AMPS):

A reactor containing 185 grams of water and 109 grams of Star DRI 180 (95% DE 18 powdered dent maltodextrin from Tate and Lyle) was heated to 85° C. The solution was slightly milky and viscous. 109 grams of acrylic acid was added to the reactor over a period of 60 minutes. An initiator solution of 20.4 grams of erythorbic acid in 97 grams of water was added over 70 minutes along with the monomer feed. A second initiator solution of 20.6 grams of tertbutyl hydroperoxide (70% solution in water) dissolved in 97 grams of water was simultaneously added to the reactor over the same period of 70 minutes. The solution changed into faint yellow color after initial addition of acrylic acid. The reaction product was held at 85° C. for 30 minutes. The solution was dark yellow color. 175 grams of sodium 2-acrylamido-2-methyl propane sulfonate AMPS 50% was added to the reactor over a period of 60 minutes. An initiator solution of 10.2 grams of erythorbic Acid in 48.5 grams of water was added over 70 minutes along with the monomer feed. A second initiator solution of 10.3 grams of tertbutyl hydroperoxide (70% solution in water) dissolved in 47 grams of water was simultaneously added to the reactor over the same period of 70 minutes. The reaction product was held at 85° C. for an additional hour. 109 grams of 50% sodium Hydroxide was added to the polymer solution after the reaction product was cooled to 50° C. The final product was dark amber color solution with 35% solids.

Example 35

Example of a hybrid dendrite copolymer composition using acrylic acid and diallyldimethylammonium chloride (DADMAC):

A reactor containing 185 grams of water and 109 grams of Star DRI 180 (95% DE 18 powdered dent maltodextrin from Tate and Lyle) was heated to 85° C. 109 grams of acrylic acid was added to the reactor over a period of 60 minutes. An initiator solution of 20.4 grams of erythorbic Acid in 97 grams of water was added over 70 minutes along with the monomer feed. A second initiator solution of 20.6 grams of tertbutyl hydroperoxide (70% solution in water) dissolved in 97 grams of water was simultaneously added to the reactor over the same period of 70 minutes. The solution changed into faint yellow color after initial addition of acrylic acid. The reaction product was held at 85° C. for 30 minutes. The solution was dark yellow in color. 99.5 grams of a 65% solution of diallyldimethylammonium chloride (DADMAC) was added to the reactor over a period of 60 minutes. An initiator solution of 4.3 grams of ammonium persulfate in 25.2 grams of water was simultaneously added to the reactor over a period of 70 minutes. The solution changed to an amber color over the period of addition of DADMAC. The reaction product was held at 85° C. for an additional hour. 109 grams of 50% sodium hydroxide was added to the polymer solution with cooling at 50° C. The final product was dark amber in color with 38% solids.

Example 36

Example of a hybrid dendrite copolymer composition using acrylic acid and diallyldimethylammonium chloride (DADMAC):

A reactor containing 100 grams of water and 100 grams of Star Dri 180 (95% DE 18 powdered dent maltodextrin from Tate and Lyle) is heated to 75° C. 62.5 grams of acrylic acid is added to the reactor over a period of 30 minutes. An initiator solution of 4.2 grams of Vazo 50 from Wako in 120 grams of deionized water is simultaneously added to the reactor over a period of 15 minutes. The reaction product was held at 85° C. for 30 minutes. The reaction temperature is then raised to 90C. 37.7 grams of 65% solution of diallyldimethylammonium chloride is added to the reactor over a period of 30 minutes. An initiator solution of 1.7 grams of Vazo 86 from Wako in 120 grams of deionized water was simultaneously added to the reactor over a period of 30 minutes. The reaction product was held at 90° C. for an additional hour.

Example 37

A reactor containing 185 grams of water and 127 grams of maltodextrin (Star Dri 100 from Tate and Lyle) (DE 10) was heated to 85° C. 85.6 grams of acrylic acid was added to the reactor over a period of 60 minutes. An initiator solution of 9.1 grams of sodium persulfate in 60 grams of deionized water was simultaneously added to the reactor over a period of 90 minutes. The reaction product was held at 85° C. for 20 minutes. 179 grams of a 50% solution of sodium 2-acrylamido-2-methyl propane sulfonate (AMPS) was added to the reactor over a period of 60 minutes. An initiator solution of 4.5 grams of sodium persulfate in 30 grams of deionized water was simultaneously added to the reactor over a period of 70 minutes. The reaction product was held at 85° C. for an additional hour. The polymer was then neutralized by adding 85.6 grams of a 50% solution of NaOH and preserved by adding 0.3 grams of Proxel GXL as a biocide.

Example 38

A reactor containing 185 grams of water and 136 grams of a corn syrup (Staley 1300 from Tate and Lyle) (DE 42) was heated to 85° C. 109 grams of acrylic acid was added to the reactor over a period of 60 minutes. An initiator solution of 11.5 grams of sodium persulfate in 60 grams of deionized water was simultaneously added to the reactor over a period of 90 minutes. The reaction product was held at 85° C. for 20 minutes. 175 grams of a 50% solution of sodium 2-acrylamido-2-methyl propane sulfonate (AMPS) was added to the reactor over a period of 60 minutes. An initiator solution of 4.5 grams of sodium persulfate in 30 grams of deionized water was simultaneously added to the reactor over a period of 70 minutes. The reaction product was held at 85° C. for an additional hour. The polymer was then neutralized by adding 109 grams of a 50% solution of NaOH and preserved by adding 0.3 grams of Proxel GXL as a biocide.

Example 39

A reactor containing 235 grams of water, 0.02 grams of ferrous ammonium sulfate hexahydrate, 1.7 grams of 35% hydrogen peroxide and 16 grams of Finnfix BDA (carboxy methyl cellulose, from CP Kelco) was heated to 60° C. for 16 hours to depolymerize the cellulose. The cellulose was found to be depolymerized to a weight average molecular weight of approximately 23,000. The reactor temperature is then raised to 85° C. 45 grams of a 50% solution of sodium 2-acrylamido-2-methyl propane sulfonate (AMPS) is added to the reactor over a period of 30 minutes. An initiator solution of 2 grams of sodium persulfate in 40 grams of deionized water is simultaneously added to the reactor over a period of 30 minutes. The reaction product is held at 85° C. for 15 minutes. 32.5 grams of acrylic acid is added to the reactor over a period of 30 minutes. An initiator solution of 1.5 grams of sodium persulfate in 40 grams of deionized water is simultaneously added to the reactor over a period of 30 minutes. The reaction product was held at 85° C. for an additional hour. The polymer was then neutralized by adding 6 grams of a 50% solution of NaOH.

Example 40

A reactor containing 285 grams of water and 158 grams of a oxidized starch containing 27 mole % carboxylic acid and 10 mole % aldehyde functionality with a weight average molecular weight of 62,000 and a number average molecular weight of 15,000 was heated to 85° C. 75.6 grams of acrylic acid was added to the reactor over a period of 60 minutes. An initiator solution of 6.1 grams of sodium persulfate in 60 grams of deionized water was simultaneously added to the reactor over a period of 90 minutes. The reaction product was held at 85° C. for 20 minutes. 129 grams of a 50% solution of sodium 2-acrylamido-2-methyl propane sulfonate (AMPS) was added to the reactor over a period of 60 minutes. An initiator solution of 3.5 grams of sodium persulfate in 30 grams of deionized water was simultaneously added to the reactor over a period of 70 minutes. The reaction product was held at 85° C. for an additional hour. The polymer was then partically neutralized by adding 25.6 grams of a 50% solution of NaOH and preserved by adding 0.3 grams of Proxel GXL as a biocide.

Example 41

A reactor containing 120 grams of carboxy methyl inulin solution (Dequest PB 11615 from Themophos) is heated to 85° C. 55 grams of acrylic acid is added to the reactor over a period of 60 minutes. An initiator solution of 5.5 grams of sodium persulfate in 60 grams of deionized water is simultaneously added to the reactor over a period of 70 minutes. The reaction product is held at 85° C. for 30 minutes. 149 grams of a 50% solution of sodium 2-acrylamido-2-methyl propane sulfonate (AMPS) is added to the reactor over a period of 60 minutes. An initiator solution of 3.5 grams of sodium persulfate in 30 grams of deionized water is simultaneously added to the reactor over a period of 70 minutes. The reaction product is held at 85° C. for an additional hour. The polymer is then neutralized by adding 7 grams of a 50% solution of NaOH.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described herein, the invention is not intended to be limited to the details shown. Rather, various modifications may be made in the details within the range and scope of equivalents of the claims and without departing from the spirit and scope of the invention.

What is claimed:
1. A hybrid dendrite copolymer composition obtained by free radical polymerization of at least one first ethylenically unsaturated monomer, and at least one second ethylenically unsaturated monomer different from said first ethylenically unsaturated monomer, said free radical polymerization being in the presence of a naturally derived hydroxyl containing chain transfer agent selected from the group consisting of maltodextrin, chemically modified maltodextrin, corn syrup, chemically modified corn syrup, starch, chemically modified starch, oxidized starch, and chemically modified oxidized starch, and combinations thereof, said chemical modification when present being selected from the group consisting of (i) hydrolysis by the action of acids, enzymes, oxidizers or heat; (ii) esterification; (iii) chemical modification with carboxylates, sulfonates, phosphates, phosphonates, aldehydes, silanes, alkyl glycosides, alkyl-hydroxyalkyls, or carboxy-alkyl ethers, and (iv) etherification via treatment with one or more of propylene oxide, ethylene oxide, and 2,3-epoxypropyl trimethyl ammonium chloride, wherein said first and second ethylenically unsaturated monomers are polymerized in sequential polymerization steps, wherein said first polymerization step forms at least one first polymer side chain consisting essentially of said first ethylenically unsaturated monomer attached to said naturally derived hydroxyl containing chain transfer agent and said second polymerization step forms at least one second polymer side chain consisting essentially of said second ethylenically unsaturated monomer attached to said naturally derived hydroxyl containing chain transfer agent, to form a hybrid dendrite copolymer wherein said first and second polymer side chains are attached at different points on the naturally derived hydroxyl containing chain transfer agent, wherein said at least one first polymer side chain and said at least one second polymer side chain are attached to said naturally derived hydroxyl containing chain transfer agent through an attachment mode independently selected from direct attachment, attachment through a carbonyl moiety, and attachment through a moiety represented by the structure —(CHOH)$_p$—C(O)— where p is an integer that is 3, 4 or 5, wherein each of said first and second polymerization steps is initiated by a non-metal initiator or a non-metal ion initiator, wherein the copolymer composition is water-soluble, and with the proviso that when at least one of the first or second ethylenically unsaturated monomers is cationic, the copolymer composition is substantially free of acrylamide or methacrylamide.

2. The hybrid dendrite copolymer composition of claim 1 wherein the composition comprises at least two different hybrid synthetic copolymers and at least two different hybrid copolymers.

3. The hybrid dendrite copolymer composition of claim 2 wherein at least two hybrid copolymers each have the following structure:

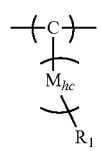

where C is a moiety derived from the naturally derived hydroxyl containing chain transfer agent, $M_{hc}$ is the synthetic portion of the hybrid copolymer derived from one or more ethylenically unsaturated monomers and $R_1$ =H from chain transfer or I from reaction with the initiator radical or the naturally derived hydroxyl containing chain transfer agent formed by combination of two growing chains or another moiety formed from a termination reaction.

4. The hybrid dendrite copolymer composition of claim 2 wherein at least two hybrid synthetic copolymers each have the following structure:

where I is an initiator fragment, H is the proton abstracted from the naturally derived hydroxyl containing chain transfer agent and $M_{hsc}$ is the synthetic portion of the hybrid synthetic copolymer derived from one or more ethylenically unsaturated monomers.

5. The hybrid dendrite copolymer composition of claim 1 wherein the at least one first ethylenically unsaturated monomer or the at least one second ethylenically unsaturated monomer is anionic.

6. The hybrid dendrite copolymer composition of claim 1 wherein the at least one first ethylenically unsaturated monomer or the at least one second ethylenically unsaturated monomer is selected from the group consisting of acrylic acid, methacrylic acid, ethacrylic acid, α-chloro-acrylic acid, α-cyano acrylic acid, β-methyl-acrylic acid, α-phenyl acrylic acid, β-acryloxy propionic acid, sorbic acid, α-chloro sorbic acid, angelic acid, cinnamic acid, p-chloro cinnamic acid, β-styryl acrylic acid, itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid and its sodium salt, vinyl sulfonic acid, sodium methallyl sulfonate, sulfonated styrene, (meth)allyloxybenzene sulfonic acid, vinyl phosphonic acid, sodium 1-allyloxy 2 hydroxy propyl sulfonate and maleic acid and their salts.

7. The hybrid dendrite copolymer composition of claim 1 wherein the at least one first ethylenically unsaturated monomer is non-anionic.

8. The hybrid dendrite copolymer composition of claim 7 wherein the at least one first ethylenically unsaturated monomer is cationic or nonionic.

9. The hybrid dendrite copolymer composition of claim 1 wherein the at least one second ethylenically unsaturated monomer is non-anionic.

10. The hybrid dendrite copolymer composition of claim 9 wherein the at least one second ethylenically unsaturated monomer is cationic or nonionic.

11. The hybrid dendrite copolymer composition of claim 1 wherein the at least one first ethylenically unsaturated monomer is anionic and the at least one second ethylenically unsaturated monomer is non-anionic.

12. The hybrid dendrite copolymer composition of claim 11 wherein the first ethylenically unsaturated monomer is anionic and is selected from the group consisting of acrylic acid, itaconic acid, maleic acid, methacrylic acid, 2-acrylamido-2-methyl propane sulfonic acid and their salts and combinations thereof, and the second ethylenically unsaturated monomer is cationic and is selected from the group consisting of methacrylamidopropyltrimethyl ammonium chloride, diallyldimethyl ammonium chloride, acryloyloxyethyl trimethyl ammonium chloride, methacryloyloxyethyl trimethyl ammonium chloride and combinations thereof.

13. The hybrid dendrite copolymer composition of claim 1 wherein the at least one second ethylenically unsaturated monomer is anionic and the at least one first ethylenically unsaturated monomer is non-anionic.

14. The hybrid dendrite copolymer composition of claim 1, wherein the hybrid dendrite copolymer is anionic, cationic, zwitterionic, nonionic or amphoteric.

15. A hybrid dendrite copolymer composition obtained by free radical polymerization of at least one first ethylenically unsaturated monomer and at least one second ethylenically unsaturated monomer,
said free radical polymerization being in the presence of a naturally derived hydroxyl containing chain transfer agent selected from the group consisting of maltodextrin, chemically modified maltodextrin, corn syrup, chemically modified corn syrup, starch, chemically modified starch, oxidized starch, and chemically modified oxidized starch, and combinations thereof, said chemical modification when present being selected from the group consisting of (i) hydrolysis by the action of acids, enzymes, oxidizers or heat; (ii) esterification; (iii) chemical modification with carboxylates, sulfonates, phosphates, phosphonates, aldehydes, silanes, alkyl glycosides, alkyl-hydroxyalkyls, or carboxy-alkyl ethers, and (iv) etherification via treatment with one or more of propylene oxide, ethylene oxide, and 2,3-epoxypropyl trimethyl ammonium chloride,
wherein the monomers are polymerized in sequential polymerization steps, wherein said first polymerization step forms at least one first polymer side chain consisting essentially of said first ethylenically unsaturated monomer attached to said naturally derived hydroxyl containing chain transfer agent and said second polymerization step forms at least one second polymer side chain consisting essentially of said second ethylenically unsaturated monomer attached to said naturally derived hydroxyl containing chain transfer agent, wherein said first and second polymer side chains are attached at different points on the naturally derived hydroxyl containing chain transfer agent,
wherein said at least one first polymer side chain and said at least one second polymer side chain are attached to said naturally derived hydroxyl containing chain transfer agent through an attachment mode independently selected from direct attachment, attachment through a carbonyl moiety, and attachment through a moiety represented by the structure $-(CHOH)_p-C(O)-$ where p is an integer that is 3, 4 or 5,
wherein each of said first and second polymerization steps is initiated by a non-metal initiator or a non-metal ion initiator,
and wherein when the first or second ethylenically unsaturated monomer is cationic, the copolymer composition comprises about 20 weight percent or greater of the cationic ethylenically unsaturated monomer based on the weight of the dendrite copolymer composition and is substantially free of acrylamide or methacrylamide.

16. A hybrid dendrite copolymer composition comprising a naturally derived hydroxyl containing chain transfer agent selected from the group consisting of maltodextrin, chemically modified maltodextrin, corn syrup, chemically modified corn syrup, starch, chemically modified starch, oxidized starch, and chemically modified oxidized starch, and combinations thereof, said chemical modification when present being selected from the group consisting of (i) hydrolysis by the action of acids, enzymes, oxidizers or heat; (ii) esterification; (iii) chemical modification with carboxylates, sulfonates, phosphates, phosphonates, aldehydes, silanes, alkyl glycosides, alkyl-hydroxyalkyls, or carboxy-alkyl ethers, and (iv) etherification via treatment with one or more of propylene oxide, ethylene oxide, and 2,3-epoxypropyl trimethyl ammonium chloride;
at least one first polymer side chain consisting essentially of a first ethylenically unsaturated monomer, and
at least one second polymer side chain consisting essentially of a second ethylenically unsaturated monomer different from said first ethylenically unsaturated monomer,
wherein said at least one first polymer side chain and said at least one second polymer side chain are attached at different points on the naturally derived hydroxyl containing chain transfer agent,
wherein said at least one first polymer side chain and said at least one second polymer side chain are attached to said naturally derived hydroxyl containing chain transfer agent through an attachment mode independently selected from direct attachment, attachment through a carbonyl moiety, and attachment through a moiety represented by the structure $-(CHOH)_p-C(O)-$ where p is an integer that is 3, 4 or 5,
wherein the hybrid dendrite copolymer composition is water-soluble,
and with the proviso that when at least one of the first or second ethylenically unsaturated monomers is cationic, the copolymer composition is substantially free of acrylamide or methacrylamide.

17. A method of preparing the water soluble hybrid dendrite copolymer composition of claim 1, the method comprising:
i) polymerizing the at least one first ethylenically unsaturated monomer in the presence of the naturally derived hydroxyl containing chain transfer agent and the non-metal initiator or non-metal ion initiator; and
polymerizing the at least one second ethylenically unsaturated monomer, in the presence of the naturally derived hydroxyl containing chain transfer agent and the non-metal initiator or non-metal ion initiator.

* * * * *